(12) United States Patent  
Jin

(10) Patent No.: US 11,169,599 B2  
(45) Date of Patent: Nov. 9, 2021

(54) INFORMATION PROCESSING APPARATUS, INFORMATION PROCESSING METHOD, AND PROGRAM

(71) Applicant: SONY CORPORATION, Tokyo (JP)

(72) Inventor: Yufeng Jin, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/758,502

(22) PCT Filed: Aug. 3, 2018

(86) PCT No.: PCT/JP2018/029273  
§ 371 (c)(1),  
(2) Date: Apr. 23, 2020

(87) PCT Pub. No.: WO2019/087502  
PCT Pub. Date: May 9, 2019

(65) Prior Publication Data  
US 2020/0341540 A1   Oct. 29, 2020

(30) Foreign Application Priority Data  
Oct. 31, 2017 (JP) .............................. JP2017-210456

(51) Int. Cl.  
*G06F 3/01* (2006.01)

(52) U.S. Cl.  
CPC ................... *G06F 3/011* (2013.01)

(58) Field of Classification Search  
CPC .................................................. G06F 3/1462  
See application file for complete search history.

(56) References Cited

U.S. PATENT DOCUMENTS

| | | | | |
|---|---|---|---|---|
| 8,396,282 B1* | 3/2013 | Huber | ................... | G06K 9/4623 382/153 |
| 2011/0125790 A1 | 5/2011 | Choi et al. | | |
| 2014/0282045 A1* | 9/2014 | Ayanam | ................ | G06F 3/0488 715/740 |
| 2015/0094551 A1* | 4/2015 | Frix | ..................... | A61B 5/1121 600/324 |
| 2016/0287129 A1* | 10/2016 | Atallah | ................... | A61B 5/352 |
| 2017/0188066 A1 | 6/2017 | Gaidar et al. | | |

FOREIGN PATENT DOCUMENTS

| | | |
|---|---|---|
| JP | H05-282279 A | 10/1993 |
| JP | 2003-233798 A | 8/2003 |
| JP | 2009-194597 A | 8/2009 |
| JP | 2016-537701 A | 12/2016 |
| JP | 2017-003885 A | 1/2017 |

* cited by examiner

*Primary Examiner* — Di Xiao  
(74) *Attorney, Agent, or Firm* — Paratus Law Group, PLLC

(57) ABSTRACT

It is preferable for a user to experience sensation corresponding to the sensation actually experienced by the user or another user. There is provided an information processing apparatus including a data acquisition unit configured to acquire relevance data of a plurality of pieces of sensory information sensed in advance, a sensory information determination unit configured to determine second sensory information relevant to first sensory information on the basis of the relevance data, and a presentation control unit configured to control presentation of presentation data associated with the second sensory information to a user.

19 Claims, 17 Drawing Sheets

| USER ID | VISUAL INFORMATION | AUDITORY INFORMATION | TACTILE INFORMATION | OLFACTORY INFORMATION | TASTE INFORMATION | BIOMETRIC INFORMATION | GEOGRAPHIC INFORMATION | TEMPORAL INFORMATION | EVENT INFORMATION | OTHER INFORMATION |
|---|---|---|---|---|---|---|---|---|---|---|
| U1 | CAT | MEOW | HAIR'S BUSHY FEELING | SMELL OF SHAMPOO FOR CAT | – | HEART RATE RISE HAPPY | HOUSE | – | – | – |
| U2 | MOUNTAIN | SONG OF BIRD B1 | – | SMELL OF FOREST | – | CALM | GPS INFORMATION: P1 | AUGUST | EXCURSION | BIRD B1 OFTEN CRIES FROM MAY TO AUGUST. SNS: FOREST PARK K1 IS FULL OF BEAUTIFUL BIRDS IN SUMMER. |
| U2 | MOUNTAIN | – | – | – | – | CALM | GPS INFORMATION: P1 | DECEMBER | – | – |
| U2 | | GOAT'S CRY | – | SMELL OF GRASS | – | CALM | GPS INFORMATION: P2 | AUGUST | SAMBA CARNIVAL | – |
| U1 | COOKIE | CRISP | OIL, CHEWY | SMELL OF BUTTER | BUTTER FLAVOR | DETECTION OF INGESTION | RESTAURANT | – | BIRTHDAY | – |
| ... | ... | ... | ... | ... | ... | ... | ... | ... | ... | ... |

FIG. 7

| FIRST DETECTION DATA | SECOND DETECTION DATA | DEGREE OF RELEVANCE |
|---|---|---|
| VISUAL INFORMATION V1 | AUDITORY INFORMATION A1 | 2% |
| VISUAL INFORMATION V2 | VISUAL INFORMATION V1, VISUAL INFORMATION V3 | 80% |
| VISUAL INFORMATION V2 | VISUAL INFORMATION V1 | 2% |
| VISUAL INFORMATION V2 | VISUAL INFORMATION V1, TACTILE INFORMATION F3, TASTE INFORMATION G1 | 20% |
| VISUAL INFORMATION V2 | BIOMETRIC INFORMATION B1, VISUAL INFORMATION V2 | 76% |
| AUDITORY INFORMATION A1 | TASTE INFORMATION G1, TEMPORAL INFORMATION T1 | 45% |
| VISUAL INFORMATION V2 | VISUAL INFORMATION V3 | 77% |
| AUDITORY INFORMATION A1 | TASTE INFORMATION G1, TEMPORAL INFORMATION T2 | 65% |
| VISUAL INFORMATION V3 | GPS INFORMATION P4 | 100% |

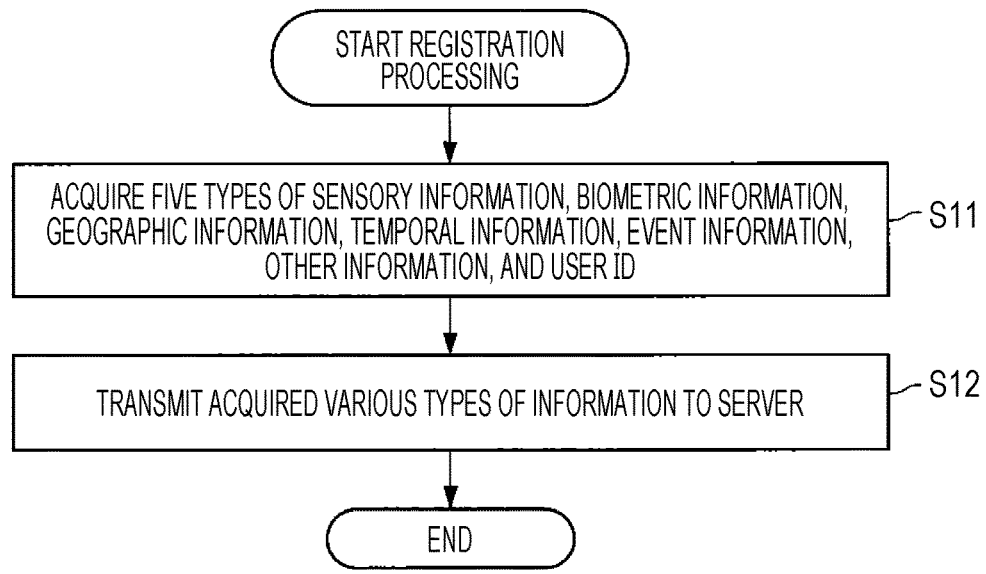

FIG. 8

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2018/029273 (filed on Aug. 3, 2018) under 35 U.S.C. § 371, which claims priority to Japanese Patent Application No. 2017-210456 (filed on Oct. 31, 2017), which are all hereby incorporated by reference in their entirety.

TECHNICAL FIELD

The present disclosure relates to an information processing apparatus, an information processing method, and a program.

BACKGROUND ART

Technology that presents presentation data associated with predetermined sensory information to a user for allowing the user to experience predetermined sensation is used nowadays. For example, there is a technique of generating presentation data associated with sensory information by a computer or the like and presenting the generated presentation data to a user. In one example, a technique of a receiving device that generates presentation data associated with sensory information received from a transmitting device is disclosed (e.g., see Patent Document 1). In this Document, the sensory information associated with the presentation data is generally generated by a human.

CITATION LIST

Patent Document

Patent Document 1: Japanese Patent Application Laid-Open No. 2009-194597

SUMMARY OF THE INVENTION

Problems to be Solved by the Invention

However, the user wants to re-experience sensation similar to the sensation that the user has actually experienced in some cases. Alternatively, the user can want to experience sensation similar to the sensation actually experienced by other users also in some cases. Thus, it is desirable to provide technology that enables a user to experience sensation corresponding to the sensation actually experienced by the user or other users.

Solutions to Problems

According to the present disclosure, there is provided an information processing apparatus including a data acquisition unit configured to acquire relevance data of a plurality of pieces of sensory information sensed in advance, a sensory information determination unit configured to determine second sensory information relevant to first sensory information on the basis of the relevance data, and a presentation control unit configured to control presentation of presentation data associated with the second sensory information to a user.

According to the present disclosure, there is provided an information processing method including acquiring relevance data of a plurality of pieces of sensory information sensed in advance, determining second sensory information relevant to first sensory information on the basis of the relevance data, and controlling, by a processor, presentation of presentation data associated with the second sensory information to a user.

According to the present disclosure, there is provided a program for causing a computer to function as an information processing apparatus including a data acquisition unit configured to acquire relevance data of a plurality of pieces of sensory information sensed in advance, a sensory information determination unit configured to determine second sensory information relevant to first sensory information on the basis of the relevance data, and a presentation control unit configured to control presentation of presentation data associated with the second sensory information to a user.

Effects of the Invention

According to the present disclosure as described above, the technology is provided that enables a user to experience sensation corresponding to the sensation actually experienced by the user or other users. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 6 is a diagram illustrating an example of storage data.

FIG. 7 is a diagram illustrating an example of relevance data.

FIG. 8 is a flowchart illustrating an example of registration processing performed by the information processing system according to an embodiment of the present disclosure.

MODE FOR CARRYING OUT THE INVENTION

Figure 1:
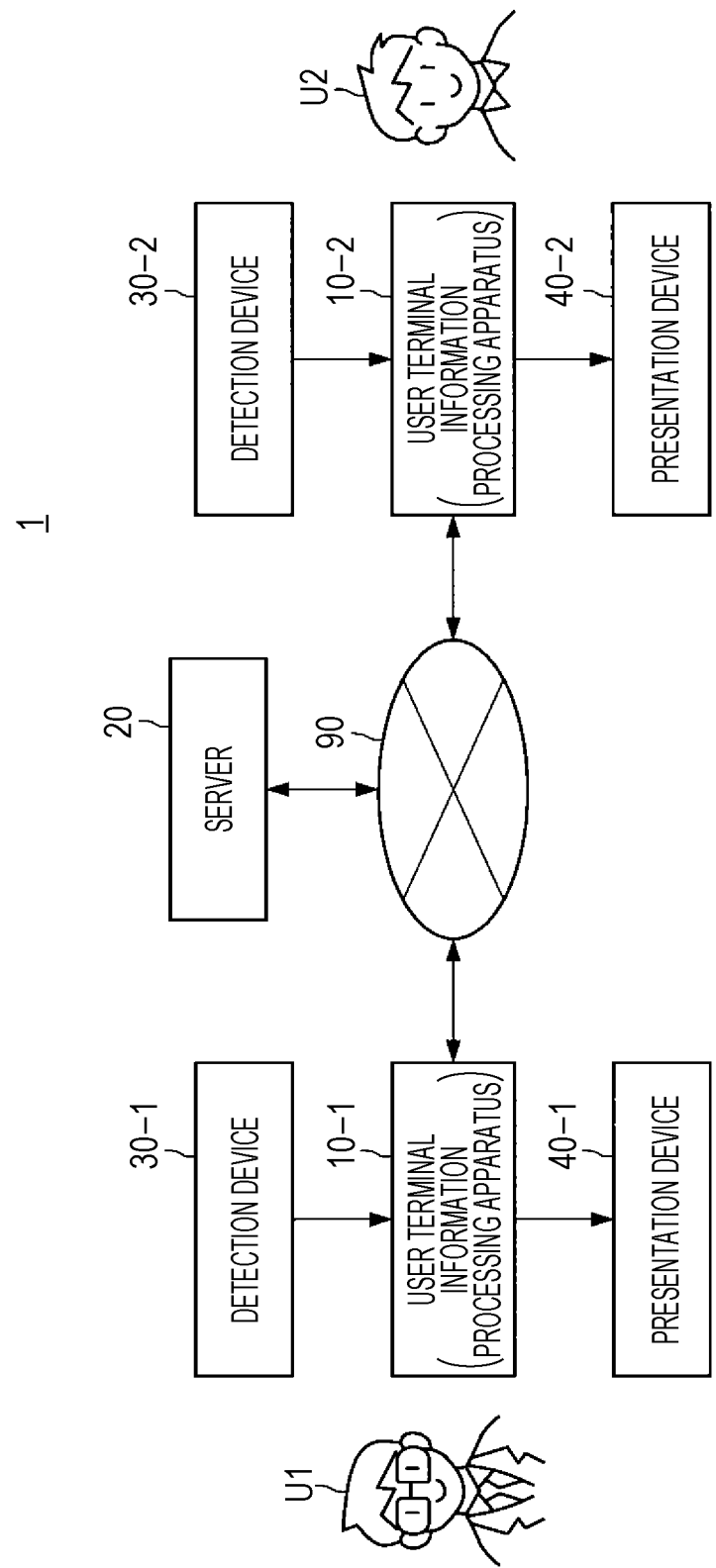
FIG. 1 is a diagram illustrating an exemplary configuration of an information processing system according to an embodiment of the present disclosure.

Hereinafter, a preferred embodiment of the present disclosure will be described in detail with reference to the appended drawings. Note that, in this specification and the appended drawings, components that have substantially the same function and configuration are denoted with the same reference numerals, and repeated explanation of these structural elements is omitted.

Note that, in the present specification and the drawings, a plurality of structural elements that has substantially the same or similar function and structure is sometimes distinguished from each other using different numbers after the same reference sign. However, in a case where there is no need in particular to distinguish the plurality of structural elements that has substantially the same or similar function and structure, the same reference sign alone is attached. Further, there are cases in which similar structural elements of different embodiments are distinguished by adding the same reference numeral followed by different letters. However, in a case where it is not necessary to particularly distinguish each of similar structural element, only the same reference signs are attached.

Note that the description is given in the following order.
1. Specific description of embodiments
1.1. Exemplary configuration of system
1.2. Exemplary functional configuration of user terminal
1.3. Exemplary functional configuration of server
1.4. Registration processing and data update processing
1.5. Presentation processing
1.5.1 First example
1.5.2 Second example
1.5.3 Third example
2. Exemplary hardware configuration
3. Concluding remarks 1. Specific Description of Embodiments A specific description of an embodiment of the present disclosure is now given.

[1.1. Exemplary Configuration of System]

An exemplary configuration of an information processing system according to the embodiment of the present disclosure is now described.

FIG. 1 is a diagram illustrating an exemplary configuration of an information processing system according to an embodiment of the present disclosure. As illustrated in FIG. 1, the information processing system 1 includes a user terminal 10-1, a detection device 30-1, and a presentation device 40-1. The user terminal 10-1, the detection device 30-1, and the presentation device 40-1 can be used by a user U1. The user terminal 10-1 is connected to each of the detection device 30-1 and the presentation device 40-1 by wireless or wired. In addition, the user terminal 10-1 is connected to a network 90 and is able to communicate with a server 20 via the network 90.

In addition, as illustrated in FIG. 1, the information processing system 1 includes a user terminal 10-2, a detection device 30-2, and a presentation device 40-2. The user terminal 10-2, the detection device 30-2, and the presentation device 40-2 can be used by a user U2. The user terminal 10-2 is connected to each of the detection device 30-2 and the presentation device 40-2 by wireless or wired. In addition, the user terminal 10-2 is connected to the network 90 and is able to communicate with the server 20 via the network 90.

Moreover, in the example illustrated in FIG. 1, the number of users is two (user U1 and user U2). However, the number of users is not limited to a particular number of users. In other words, in a case where the user again experiences sensation similar to the sensation actually experienced by the same user, the number of users can be one. Alternatively, in a case where the user wants to experience sensation similar to the sensation actually experienced by another user, at least two users are necessary. The number of users can be three or more. In a case where the number of users is three or more, it is sufficient that the user terminal 10, the detection device 30, and the presentation device 40 are provided for each of three or more users.

Moreover, an embodiment of the present disclosure is mainly based on the assumption that the user terminal 10, the detection device 30, and the presentation device 40 are provided for each user. However, at least some of the user terminal 10, the detection device 30, and the presentation device 40 may not be necessarily provided for each user. In other words, at least some of the user terminal 10, the detection device 30, and the presentation device 40 can be shared by some or all users. In this case, the user can be identifiable by a user ID that is input upon logging in.

Further, an embodiment of the present disclosure is mainly based on the assumption that the user terminal 10-1 and the user terminal 10-2 are smartphones. However, the user terminal 10-1 and the user terminal 10-2 are not limited to a smartphone. For example, at least some of the user terminal 10-1 and the user terminal 10-2 can be a mobile phone, a tablet computer, a personal computer (PC), a head-mounted display, or a camera. Each of the user terminal 10-1 and the user terminal 10-2 can function as an information processing apparatus.

As illustrated in FIG. 1, the information processing system 1 includes the server 20. The server 20 is connected to the network 90. Then, the server 20 is able to communicate with the user terminal 10-1 via the network 90. In addition, the server 20 is able to communicate with the user terminal 10-2 via the network 90. As illustrated in FIG. 1, the server 20 is constituted by a computer that is independent of the user terminal 10. However, various functions of the server 20 can be incorporated into either the user terminal 10-1 or the user terminal 10-2.

The exemplary configuration of the information processing system 1 according to an embodiment of the present disclosure is described above.

[1.2. Exemplary Functional Configuration of User Terminal]

An exemplary functional configuration of the user terminal 10 is now described.

Figure 2:
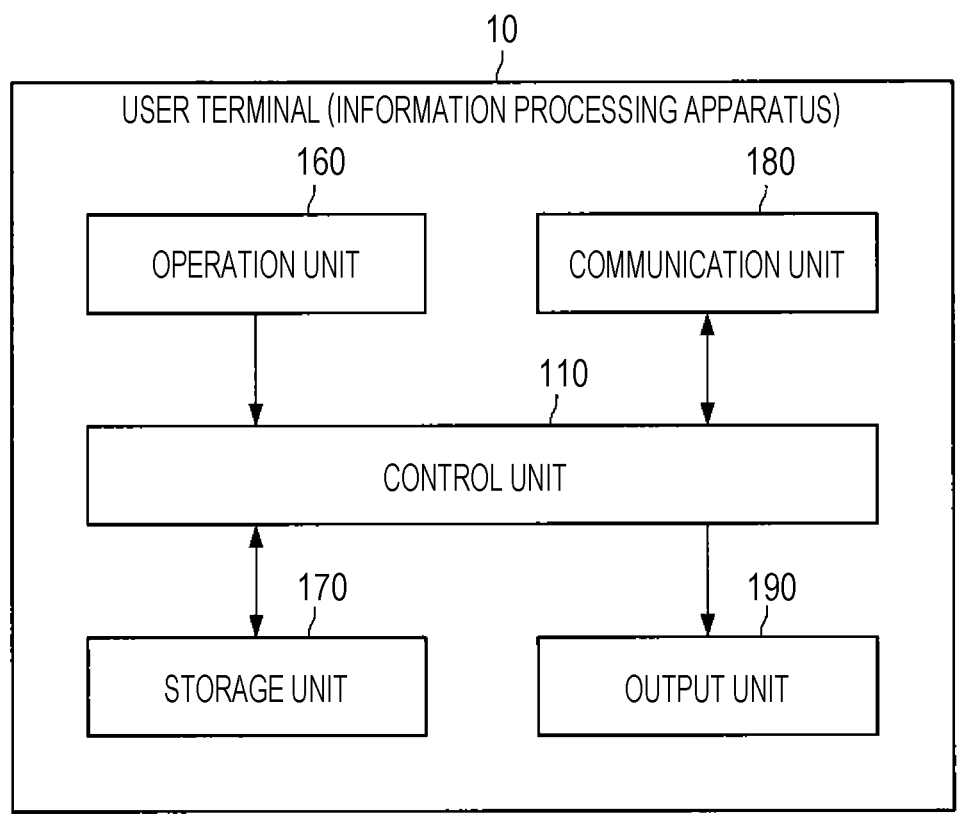
FIG. 2 is a diagram illustrating an exemplary functional configuration of user terminal according to an embodiment of the present disclosure.

FIG. 2 is a diagram illustrating an exemplary functional configuration of the user terminal 10 according to an embodiment of the present disclosure. As illustrated in FIG. 2, the user terminal 10 includes a control unit 110, an operation unit 160, a storage unit 170, a communication unit 180, and an output unit 190. These functional blocks equipped in the user terminal 10 are now described.

The control unit 110 can be constituted by a processor such as one or a plurality of central processing units (CPUs) for example. In a case where this block is constituted by a processor such as a CPU, the processor can be constituted by an electronic circuit. The control unit 110 can be implemented by executing a program by such a processor. A specific configuration of the control unit 110 is now described.

Figure 3:
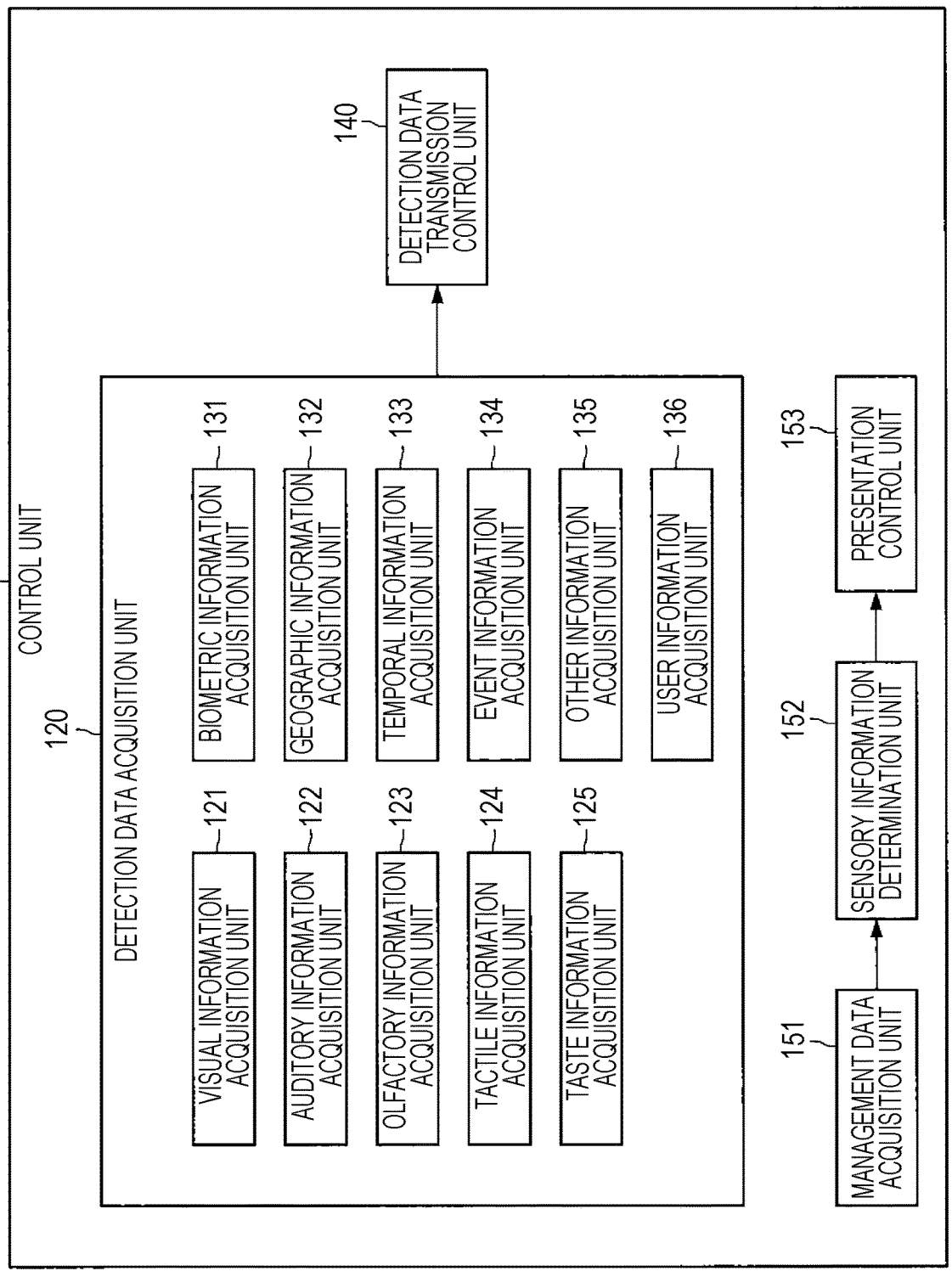
FIG. 3 is a diagram illustrating a specific configuration example of a control unit.

FIG. 3 is a diagram illustrating a specific configuration example of the control unit 110. As illustrated in FIG. 3, the control unit 110 includes a detection data acquisition unit 120, a detection data transmission control unit 140, a management data acquisition unit 151, a sensory information determination unit 152, and a presentation control unit 153.

The detection data acquisition unit 120 acquires, from the detection device 30, data detected by the detection device 30 (detection data). The detection data acquisition unit 120 includes a visual information acquisition unit 121, an auditory information acquisition unit 122, an olfactory information acquisition unit 123, a tactile information acquisition unit 124, and a taste information acquisition unit 125. In addition, the detection data acquisition unit 120 includes a biometric information acquisition unit 131, a geographic information acquisition unit 132, a temporal information acquisition unit 133, an event information acquisition unit 134, other information acquisition unit 135, and a user information acquisition unit 136.

The visual information acquisition unit 121 acquires, in a case where the detection device 30 has a visual information detector capable of sensing visual information of the user, the visual information sensed by the visual information detector. In this case, the visual information detector, which is provided with an imaging device, can obtain an image of the real world captured by the imaging device as visual information or can obtain a three-dimensional environment map of the real world that is obtained from an image using an environmental sensing technique (simultaneous localization and mapping (SLAM)) as visual information. For example, the visual information can be detected by one or a combination of a plurality of an RGB camera, a depth camera, a polarization camera, an infrared camera, an ultrasonic sensor, a gyro sensor, an accelerometer, and a global positioning system (GPS) sensor.

The auditory information acquisition unit 122 acquires, in a case where the detection device 30 includes an auditory information detector capable of sensing auditory information of the user, the auditory information sensed by the auditory information detector. In this case, the auditory information detector can include a microphone, so that it obtains sound information detected by the microphone as auditory information. The auditory information acquisition unit 122 can acquire, in a case where an object in the sound source is recognized from sound information, a recognition result of the object together with the sound information. The auditory information detector, in a case of including a microphone having directivity, can acquire orientation information and distance information from the microphone to the sound source together with the sound information. The distance information can be represented by absolute coordinates or relative coordinates.

The olfactory information acquisition unit 123 acquires, in a case where the detection device 30 has an olfactory information detector capable of sensing olfactory information of the user, the olfactory information sensed by the olfactory information detector. In this case, the olfactory information detector can include a plurality of sensors that responds to the concentration of a particular gas, so that it obtains a result detected by these sensors as olfactory information. Alternatively, the olfactory information detector can include a biosensor that imitates the olfactory function of a human to obtain a result detected by such a sensor as the olfactory information.

The tactile information acquisition unit 124 acquires, in a case where the detection device 30 has a tactile information detector capable of sensing tactile information of the user, the tactile information sensed by the tactile information detector. In this case, the tactile information detector can include a sensor attached to a part of the user's body such as arm, foot, or finger, so that it obtains sensation, which is detected by such a sensor, such as a sense of force applied to the user's hand holding an object or a sense of unevenness of a contact surface by the user touching a material, as the tactile information.

The taste information acquisition unit 125 acquires, in a case where the detection device 30 has a taste information detector capable of sensing taste information of the user, the taste information sensed by the taste information detector. In this case, the taste information detector can be constituted by a sensor (e.g., an electroencephalogram sensor, a biometric information sensor, etc.) mounted on the user, so that it obtains a result, detected by such a sensor as the taste information. Alternatively, in a case where the taste information detector includes a taste sensor that directly reacts to a component ingested from a user's mouth, the taste information detector can obtain a result detected by such a sensor as the taste information.

In this way, visual information, auditory information, tactile information, olfactory information, and taste information can be acquired. Generally, visual information, auditory information, tactile information, olfactory information, and taste information are also referred to as five types of sensory information. Thus, the term "sensory information" used herein can be also used as at least one of the five types of sensory information. Then, the five types of sensory information can include visual information, auditory information, tactile information, olfactory information, and taste information. However, the sensory information is not limited to any one of the five types of sensory information.

The biometric information acquisition unit 131 acquires, in a case where the detection device 30 has a biometric information detector capable of sensing biometric information of the user, the biometric information sensed by the biometric information detector. In this case, the biometric information detector can be constituted by a heart rate monitor attached to the user, so that it obtains a heart rate detected by such a monitor (e.g., information of the heart rate rise or the like from change in heart rate) as the biometric information. Alternatively, the biometric information detector, which is constituted by a sweat sensor, can obtain the amount of sweat detected by such a sensor (e.g., information indicating that the user feels the heat in a case where the amount of sweating exceeds a threshold) as the biometric information. Alternatively, the biometric information detector, which is constituted by a temperature sensor attached to the user, can obtain a change in body temperatures detected by such a sensor as the biometric information.

The geographic information acquisition unit 132 acquires geographic information detected by the user terminal 10. The format of the geographic information is not limited to a particular form. For example, the geographic information can include GPS information (location information) of the user. The temporal information acquisition unit 133 acquires temporal information detected by the user terminal 10. For example, the temporal information can include date, time information, or the like. The event information acquisition unit 134 acquires event information detected by the user terminal 10. The type of event is not limited to a particular type. For example, the event can be excursion date, birthday, or Samba carnival date.

The other information acquisition unit 135 acquires other information detected by the user terminal 10. The other information can be any information. For example, the other information can be information registered on the SNS by the user. For example, the other information can be information acquired from other devices, such as biometric information indicating the biological status of a pet cat that is acquired by the biometric sensor attached to the cat. The user information acquisition unit 136 acquires a user ID detected by the user terminal 10.

The description continues by referring to FIG. 2 again.

The operation unit 160 has a function of receiving an operation input by a user. An embodiment of the present disclosure is mainly based on the assumption that the operation unit 160 includes a touchscreen panel. However, the operation unit 160 can include a button, a mouse, a keyboard, a switch, a lever, or the like. In addition, the operation unit 160 can include a microphone that detects a user's voice.

The storage unit 170 includes a memory and is a recording medium that stores a program executed by the control unit 110 or data necessary for executing the program. In addition, storage unit 170 temporarily stores data for the arithmetic logic operation by the control unit 110. For example, the storage unit 170 is constituted by a magnetic storage device, a semiconductor storage device, an optical storage device, or a magneto-optical storage device.

The communication unit 180 includes a communication circuit and has a function of communicating with other devices via a network. For example, the communication unit 180 has a function of acquiring data from the other devices and providing the other devices with data. For example, the communication unit 180 is constituted by a communication interface.

The output unit 190 outputs various types of information. For example, the output unit 190 can include a display capable of performing the display visually recognizable by the user. In this case, the display can be a liquid crystal display or an organic electro-luminescence (EL) display. Moreover, for example, in a case where no display of information is necessary, the user terminal 10 may not necessarily include the output unit 190.

Moreover, an embodiment of the present disclosure is mainly based on the assumption that the operation unit 160, the communication unit 180, the storage unit 170, and the output unit 190 are included in the user terminal 10. However, at least one of the operation unit 160, the communication unit 180, the storage unit 170, or the output unit 190 can be provided outside the user terminal 10.

The exemplary functional configuration of the user terminal 10 according to an embodiment of the present disclosure is described above.

[1.3. Exemplary Functional Configuration of Server]

Figure 4:
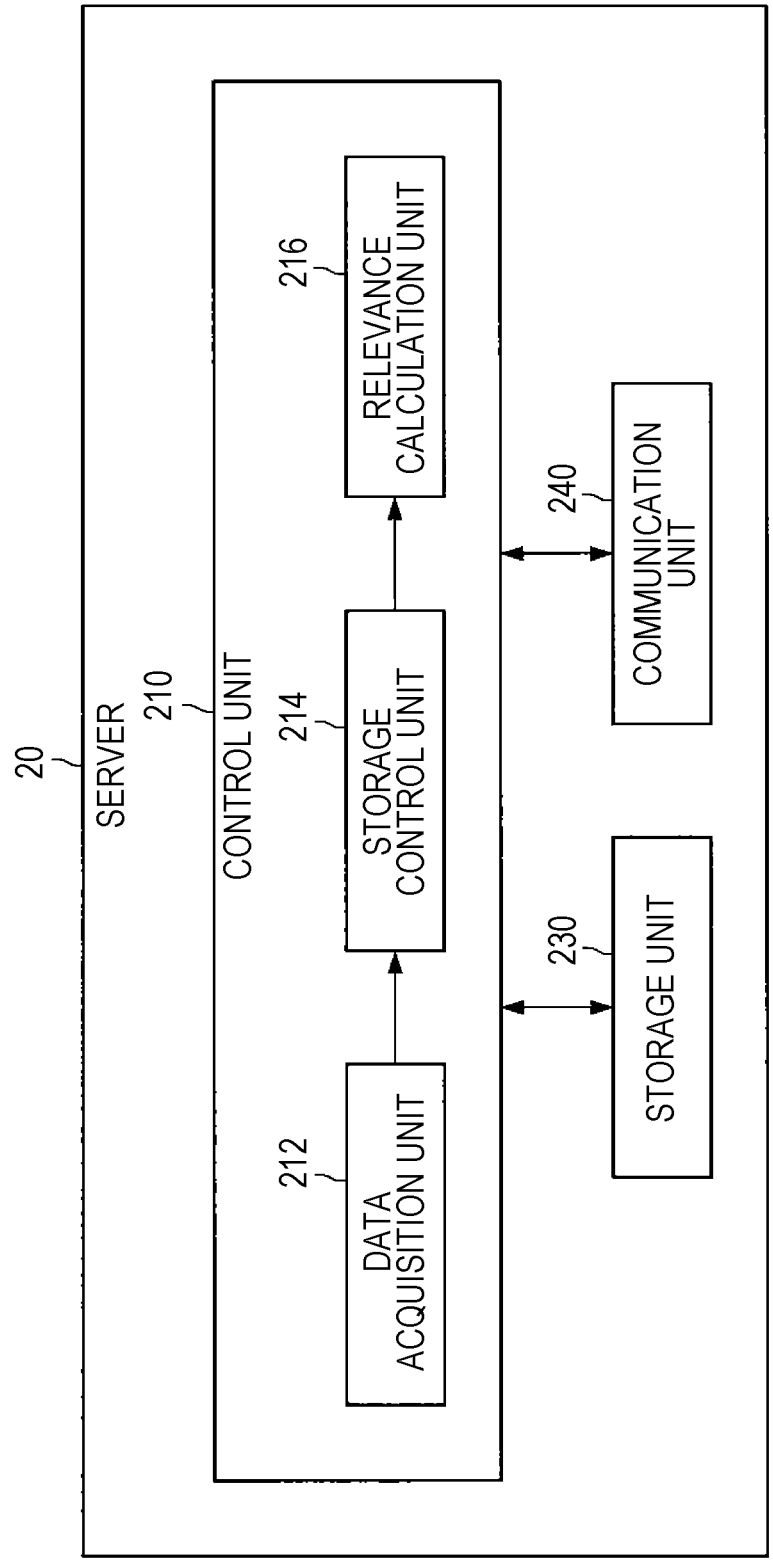
FIG. 4 is a diagram illustrating an exemplary functional configuration of a server according to an embodiment of the present disclosure.

An exemplary functional configuration of the server 20 according to an embodiment of the present disclosure is now described. FIG. 4 is a diagram illustrating an exemplary functional configuration of the server 20 according to an embodiment of the present disclosure. As illustrated in FIG. 4, the server 20 includes a control unit 210, a storage unit 230, and a communication unit 240.

The control unit 210 controls each component in the server 20. Moreover, the control unit 210 can be constituted by, for example, a central processing unit (CPU) or the like. In a case where the control unit 210 is constituted by a processor such as a CPU, such a processor can be constituted by an electronic circuit. The control unit 210 can be implemented by the execution of a program by such a processor.

The storage unit 230 includes a memory and is a recording medium that stores a program executed by the control unit 210 or data necessary for executing the program. In addition, storage unit 230 temporarily stores data for the arithmetic logic operation by the control unit 210. For example, the storage unit 230 is constituted by a magnetic storage device, a semiconductor storage device, an optical storage device, or a magneto-optical storage device.

Figure 5:
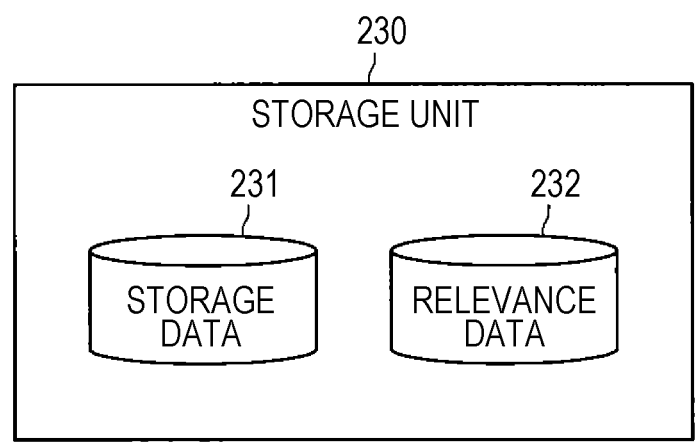
FIG. 5 is a diagram illustrating an example of data necessary for executing a program.

An example of data necessary for executing a program is now described. FIG. 5 is a diagram illustrating an example of data necessary for executing a program. As illustrated in FIG. 5, the storage unit 230 is capable of storing storage data 231 and relevance data 232 as an example of data necessary for executing a program. Moreover, the details of the storage data 231 and the relevance data 232 will be described later.

The description continues by referring to FIG. 4 again.

The communication unit 240 includes a communication circuit and has a function of communicating with other devices via a network. For example, the communication unit 240 has a function of acquiring data from the other devices and providing the other devices with data. For example, the communication unit 240 is constituted by a communication interface.

The exemplary functional configuration of the server 20 according to an embodiment of the present disclosure is described above.

[1.4. Registration Processing and Data Update Processing]

Registration processing and data update processing performed by the information processing system 1 according to an embodiment of the present disclosure are now described.

In the first place, the detection data acquisition unit 120 in the user terminal 10 acquires various types of information (five types of sensory information, biometric information, geographic information, temporal information, event information, other information, and a user ID) detected by the detection device 30 and the user terminal 10. For example, the five types of sensory information and the biometric information can be detected by the detection device 30. On the other hand, geographic information, temporal information, event information, other information, and a user ID can be detected in the user terminal 10.

One piece of information or any combination of a plurality of pieces of information in various types of information can be hereinafter referred to as "detect on data" in some cases. Such detection data is data detected at a corresponding timing from the same user. The corresponding timing can be simultaneous or can be a timing satisfying a predetermined condition established in advance.

The detection data transmission control unit 140 controls transmission of various types of information to the server 20 through the communication unit 180.

In the server 20, a data acquisition unit 212 acquires various types of information received through the communication unit 240 from the user terminal 10. Then, a storage control unit 214 updates the storage data 231 that is stored in the storage unit 230 on the basis of the various types of information acquired by the data acquisition unit 212. Specifically, it is sufficient that the storage control unit 214 adds the various types of information acquired by the data acquisition unit 212 to the storage data 231 stored in the storage unit 230.

FIG. 6 is a diagram illustrating an example of the storage data 231. Referring to FIG. 6, various types of information detected by the detection device 30-1 of the user U1 (five types of sensory information, biometric information, geographic information, temporal information, event information, other information, and a user ID="U1") are added to the storage data 231. In addition, various types of information detected a detection device 30-2 of the user U2 (five types of sensory information, biometric information, geographic information, temporal information, event information, other information, and a user ID="U2") are added to the storage data 231.

As illustrated in FIG. 6, various types of information detected at the corresponding timing from the same user are registered in the storage data 231 as one piece of data. Subsequently, a relevance calculation unit 216 calculates the relevance data 232 on the basis of the storage data 231. Specifically, the relevance calculation unit 216 calculates, on the basis of the storage data 231, the degree of relevance between the plurality of pieces of detection data on the basis of the frequency at which the plurality of pieces of detection data is detected at the corresponding timing from the same user. For example, the relevance calculation unit 216 calculates, on the basis of the storage data 231, the degree of relevance between the plurality of pieces of sensory information on the basis of the frequency at which the plurality of pieces of sensory information is detected at the corresponding timing from the same user.

An embodiment of the present disclosure is based on the assumption that the relevance calculation unit 216 calculates, as the degree of relevance, under the condition that one of the plurality of pieces of detection data is sensed, a ratio at which the other of the plurality of pieces of detection data is sensed from the same user at a timing corresponding to the one of the plurality of pieces of detection data. For example, the relevance calculation unit 216 calculates, as the degree of relevance, under the condition that one of the plurality of pieces of sensory information is sensed, a ratio at which the other of the plurality of pieces of sensory information is sensed from the same user at a timing corresponding to the one.

FIG. 7 is a diagram illustrating an example of the relevance data 232. Referring to FIG. 7, the relevance data 232 includes, under a condition that a first detection data is detected, a ratio at which a second detection data is detected from the same user at the timing corresponding to the first detection data as "degree of relevance". In FIG. 7, under the condition where the first detection data "visual information V1" is sensed, the rate at which the second detection data "auditory information A1" is sensed from the same user at the timing corresponding to the first detection data "visual information V1" is included as "degree of relevance of 2%".

Further, the degree of relevance to be compared with a threshold can be expressed in any manner. For example, as the degree of relevance, a ratio can be directly used as described above or can be another value after the ratio is converted. The calculation of the degree of relevance will be described more specifically. Moreover, characteristics extracted from the sensory information or the biometric information can be indicated using parentheses immediately after the sensory information or the biometric information (e.g., "visual information (cookie)", etc.).

For example, the following cases are assumed: visual information A (cat), visual information B (cat with mouth open), visual information C (person), tactile information A (left hand: cat's hair bushy feeling), tactile information B (right hand: weight of possessed toy), auditory information A (cat's meow), and other information A (detection of low level of blood sugar by a sensor attached to a cat).

In this case, the relevance calculation unit 216, in a case where the visual information A, the visual information C, the tactile information A, and the tactile information B are acquired at the same time, can increase the degree of relevance between the visual information C and the visual information A, can increase the degree of relevance between (the visual information A+the visual information C) and the tactile information A, and can increase the degree of relevance between (the visual information A+the visual information C+the tactile information B) and the tactile information A. In other words, the relevance calculation unit 216 can increase the degree of relevance of a newly created combination or can increase the degree of relevance of a recreated combination.

Further, the relevance calculation unit 216, in a case where the visual information A, the visual information B, and the auditory information A are simultaneously acquired as exceeding a predetermined number of times, can increase the degree of relevance of the visual information A and the visual information C, and can increase the degree of relevance of the visual information A and the visual information B. Then, in a case where the degree of relevance between the plurality of pieces of sensory information reaches a predetermined value, the relevance calculation unit 216 can define the degree of relevance between the plurality of pieces of sensory information to be "relevant".

On the other hand, in a case where the number of times that the visual information A and the tactile information B are simultaneously acquired is less than the predetermined number of times in a predetermined period or in a predetermined space, the relevance calculation unit 216 can reduce the degree of relevance between the visual information A and the tactile information B. Then, in a case where the degree of relevance between the plurality of pieces of sensory information reaches a predetermined value, the relevance calculation unit 216 can define the degree of relevance between the plurality of pieces of sensory information to be "not relevant".

Further, in a case where the degree of relevance of the combination of the visual information A, the visual information B, and the other information A to the auditory information A exceeds a threshold (e.g., it is as high as 80%) and the degree of relevance of other combination of the visual information A, the visual information B, and the other information A to the auditory information A is less than a threshold (e.g., it is as low as 2%), the other information A can be defined to be the requirement for generating the auditory information A in a situation where the visual information A and the visual information B are acquired at the same time.

Although the calculation of the degree of relevance is specifically described above, the calculation of the degree of relevance can be performed using other techniques. For example, the relevance calculation unit 216 can calculate the degree of relevance between a plurality of pieces of sensory information using techniques such as artificial intelligence and machine learning or can calculate a condition for generating other sensory information in a situation where sensory information is generated.

Moreover, an embodiment of the present disclosure is based on the assumption that the degree of relevance is calculated collectively on the basis of the detection data of any user (user U1 and user U2 in the embodiment of the present disclosure) without considering from which user the detection data included in storage data 231 is detected. However, the degree of relevance based on the detection data included in the storage data 231 can be calculated for each user for which the detection data is detected.

FIG. 8 is a flowchart illustrating an example of the registration processing performed by the information processing system 1 according to an embodiment of the present disclosure. Moreover, the flowchart illustrated in FIG. 8 merely illustrates an example of the registration processing performed by the information processing system 1 according to an embodiment of the present disclosure. Thus, the registration processing performed by the information processing system 1 according to an embodiment of the present disclosure is not limited to the example of the flowchart illustrated in FIG. 8.

In the first place, the detection data acquisition unit 120 in the user terminal 10 acquires various types of information (five types of sensory information, biometric information, geographic information, temporal information, event information, other information, and a user ID) detected by the detection device 30 and the user terminal 10 (S11). Then, the detection data transmission control unit 140 controls transmission of various types of information to the server 20 through the communication unit 180 (S12).

Figure 9:
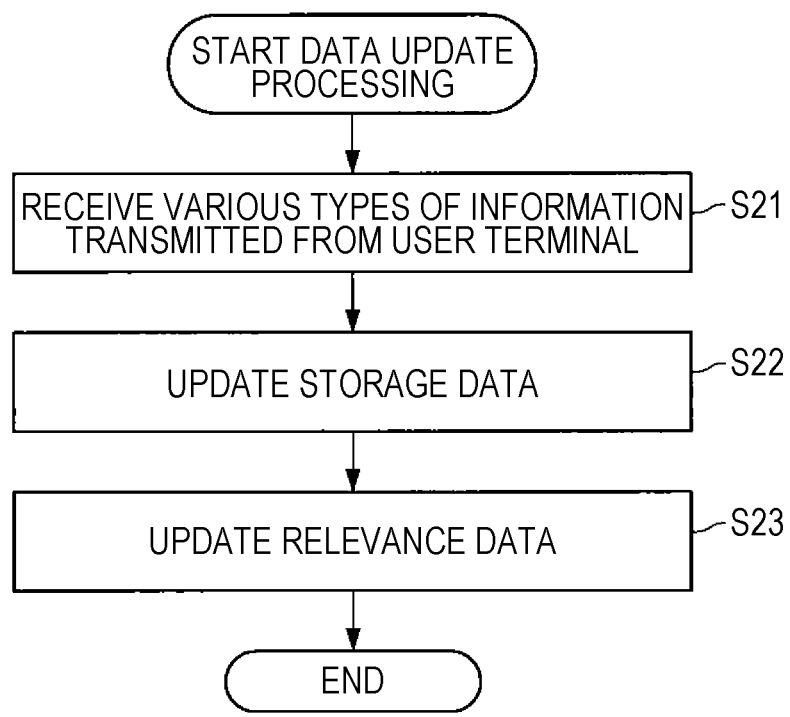
FIG. 9 is a flowchart illustrating an example of data update processing performed by the information processing system according to an embodiment of the present disclosure.

FIG. 9 is a flowchart illustrating an example of the data update processing performed by the information processing system 1 according to an embodiment of the present disclosure. Moreover, the flowchart illustrated in FIG. 9 merely illustrates an example of the data update processing performed by the information processing system 1 according to an embodiment of the present disclosure. Thus, the data update processing performed by the information processing system 1 according to an embodiment of the present disclosure is not limited to the example of the flowchart illustrated in FIG. 9.

In the server 20, the communication unit 240 receives various types of information transmitted from the user terminal 10 (S21) as the first place, and the data acquisition unit 212 acquires various types of information received through the communication unit 240. Then, the storage control unit 214 updates the storage data 231 on the basis of the various types of information acquired by the data acquisition unit 212 (S22). The relevance calculation unit 216 updates the relevance data 232 on the basis of the storage data 231 (S23).

Registration processing and data update processing performed by the information processing system 1 according to as embodiment of the present disclosure are described above.

[1.5. Presentation Processing]

Presentation processing performed by the information processing system 1 according to an embodiment of the present disclosure is now described.

1.5.1 First Example

A first example of the presentation processing performed by the information processing system 1 according to an embodiment of the present disclosure is now described. In this description, it is assumed that the user U2 wants to experience sensation similar to the sensation experienced by the user U1. However, the user U2 can be able to experience sensation similar to the sensation that the user U2 has experienced. In the user terminal 10-2, first sensory information is selected in the first place. In such a case, the first sensory information selected by the user U2 is received by the operation unit 160 and is acquired by the sensory information determination unit 152.

In an embodiment of the present disclosure, a case is mainly described where information indicating sensation that the user U2 wants to experience is selected as the first sensory information. However, the first sensory information can be selected in any way. For example, the first sensory information can be selected by the user terminal 10-2 in accordance with a predetermined algorithm. In such a case, the first sensory information selected by the predetermined algorithm is acquired by the sensory information determination unit 152.

In a case where the first sensory information is selected, the management data acquisition unit 151 acquires the relevance data 232 from the server 20. The sensory information determination unit 152 determines second sensory information relevant to the first sensory information on the basis of the relevance data. Specifically, the sensory information determination unit 152 can determine the second sensory information on the basis of sensory information whose degree of relevance to the first sensory information exceeds a threshold. For example, the sensory information determination unit 152 can determine sensory information whose degree of relevance to the first sensory information exceeds a threshold as the second sensory information.

Then, the presentation control unit 153 controls the presentation of the presentation data associated with the second sensory information to the user U2. Such a configuration makes it possible for the user U2 to experience sensation corresponding to the sensation actually experienced by the user U1.

In this case, for example, like the case where the type of the first sensory information is visual information and the type of the second sensory information auditory information, the type of the first sensory information can be different from the type of the second sensory information. In this way, the user U2 is able to experience sensation, with another type of sensation, similar to the sensation actually experienced by the user U1.

In a case where the presentation control unit 153 controls the presentation of the presentation data associated with the second sensory information to the user U2, the presentation control unit 153 may also control the presentation of the presentation data associated with the first sensory information to the user U2. In a case where the presentation data associated with the first sensory information is also presented to the user U2, it is expected that the user U2 experiences, with a stronger realistic feeling, the sensation that the user U2 wants to experience.

For example, the sensation associated with the first sensory information is indicated as "sensation X0". Then, it is assumed that "sensation X1", "sensation X2", and "sensation X3" are acquired as the sensation associated with the second sensory information relevant to the first sensory information. In this case, the presentation control unit 153 can also control the presentation of the presentation data associated with the "sensation X0" to the user U2 so that the user U2 experiences not only "sensation X1", "sensation X2", and "sensation X3" but also "sensation X0".

On the contrary, in a case where the presentation control unit 153 controls the presentation of the presentation data associated with the second sensory information to the user U2, the presentation control unit 153 does not necessarily control the presentation of the presentation data associated with the first sensory information to the user U2. In a case where the presentation data associated with the first sensory information is not presented to the user U2, the user U2 indirectly experiences the sensation that the user U2 wants to experience.

For example, it is assumed that "sensation X1", "sensation X2", and "sensation X3" are acquired as the sensation associated with the second sensory information relevant to the first sensory information, similarly to the case described above. In this case, the presentation control unit 153 may not necessarily control the presentation of the presentation data associated with "sensation X0" to the user U2 so that the "sensation X0" is not experienced by the user U2 while the "sensation X1", "sensation X2", and "sensation X3" are experienced by the user U2.

In this example, the sensory information and the presentation data can correlate with each other in advance. For example, in a case where the presentation device 40 includes a visual presentation device (e.g., a display, etc.), the presentation control unit 153 can perform control so that presentation data associated with the visual information is presented by the visual presentation device. For example, the presentation control unit 153 generates image data associated with the visual information of a cookie and controls the presentation by the visual presentation device, so that it can control the presentation of the presentation data associated with the visual information of the cookie.

For example, in a case where the presentation device 40 includes a tactile presentation device, the presentation control unit 153 can perform control so that the presentation data associated with the tactile information is presented by the tactile presentation device. For example, the presentation control unit 153 generates the tactile information associated with the tactile information of the cookie (such as the sensation of the cookie holding by the hand) and controls the presentation by the tactile presentation device, so that it can control the presentation of the presentation data associated with the tactile information of the cookie.

In this case, the presentation control unit 153 provides the user with a greasy feel of an object being touched by the user, predicts the weight from the size of the cookie, and applies pressure to the user's hand, so that it can give the user the sensation of weight. In addition, the presentation control unit 153, in a case where the user's biting operation is detected, controls the tactile presentation device to apply a predetermined appropriate repulsive force to the user's teeth, so that it can provide the user with a crisp tactile sensation of the cookie.

For example, in a case where the presentation device 40 includes an olfactory presentation device, the presentation control unit 153 can control the olfactory presentation device to present the presentation data associated with the olfactory information. For example, the presentation control unit 153 generates the olfactory information associated with the olfactory information of the cookie (such as the smell of the cookie) and controls the presentation by the olfactory presentation device, so that it can control the presentation of the presentation data associated with the olfactory information of the cookie.

In this case, the presentation control unit 153, in a case where the location of the cookie is detected, can generate the smell such that the smell is transmitted from the location of the cookie through the air. For example, the presentation control unit 153 can increase the concentration of the smell of the cookie by increasing the intensity of the emitting smell as the user approaches the virtually displayed image of the cookie.

For example, in a case where the presentation device 40 includes an auditory presentation device, the presentation control unit 153 can control the presentation data associated with the auditory information to be presented by the auditory presentation device. For example, the presentation control unit 153 generates the auditory information associated with the auditory information of the cookie (such as sound of cookie chewing) and controls presentation by the auditory presenting device, so that it can control the presentation of the presentation data associated with the auditory information of the cookie.

In this case, the presentation control unit 153 generates sound data of crisp chewing depending on the motion of the teeth and the virtual location of the cookie in the mouth and presents the generated sound data. Even in a case where the presentation of the presentation data associated with the auditory information is controlled, the presentation control unit 153 can control the presentation of localized sound data and sound data with a stereoscopic effect, which is similar to the case of controlling the presentation of the presentation data associated with the olfactory information.

In a case where the recognition of sensory information is performed, the characteristics of the sensory information can be extracted (even in a case where the recognition of biometric information is performed, the characteristics of the biometric information can be extracted). For example, in a case where the recognition of the visual information including the cookie is performed, the user experiences the sensation, so it can be shown that the user experiences the visual sensation of the cookie.

Figure 10:
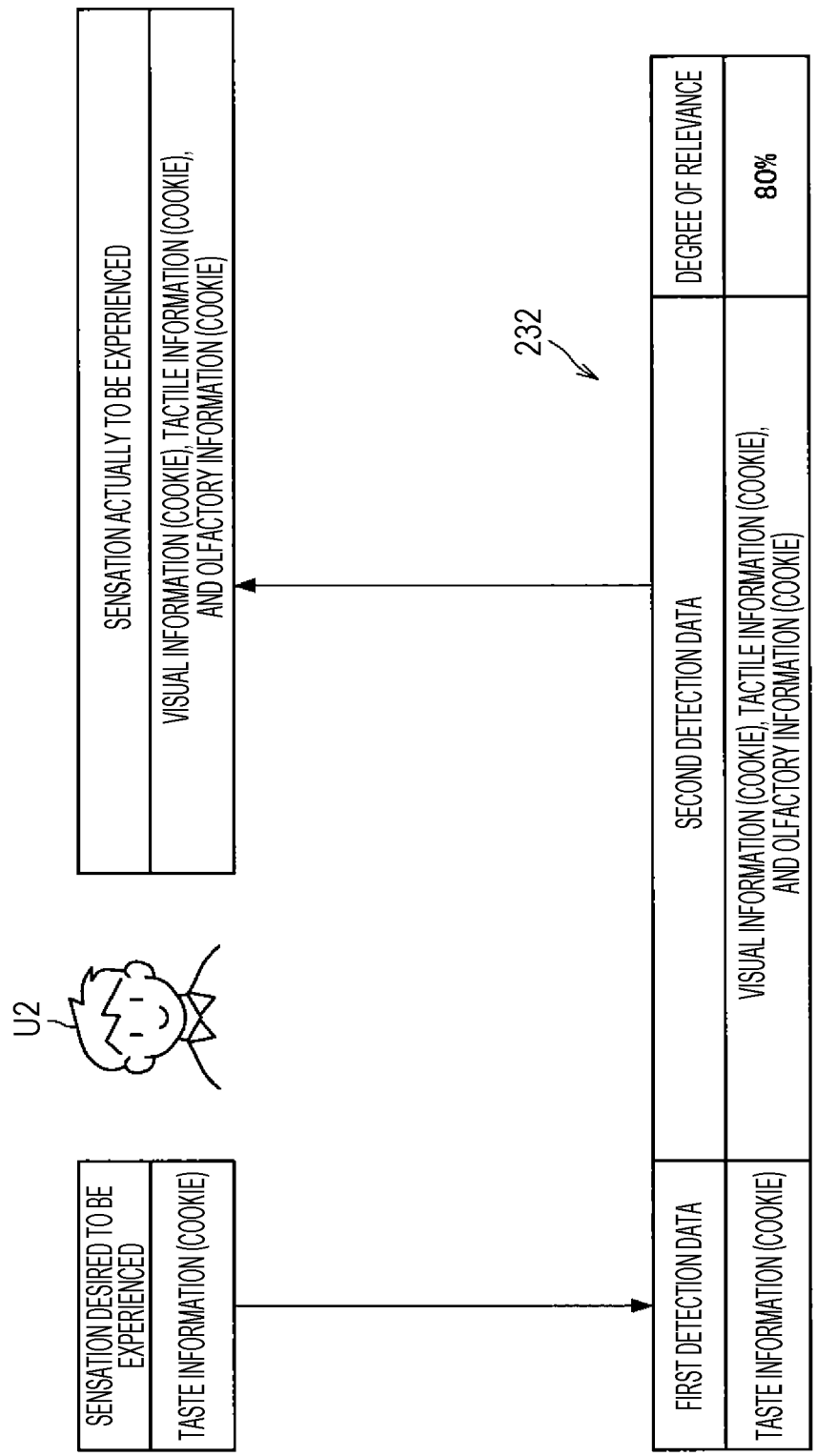
FIG. 10 is a diagram illustrating a specific example in which sensation desired to be experienced by a user is experienced indirectly by another user.

A specific example in which the sensation that the user U2 wants to experience is indirectly experienced by the user U2 is now described. In particular, the description is given of a case in which the taste of the cookie is selected as the sensation that the user U2 wants to experience and the visual, auditory, and olfactory sensations of the cookie are determined instead of the taste of the cookie as the sensation actually experienced by the user U2. FIG. 10 is a diagram illustrating a specific example in which the sensation that the user U2 wants to experience is indirectly experienced by the user U2.

As illustrated in FIG. 10, it is first assumed that the user U2 wants to experience the taste of a cookie and the user U2 selects "taste information (cookie)" set as the first sensory information in the user terminal 10-2. In such a case, "taste information (cookie)" set as the first sensory information selected by the user U2 is received by the operation unit 160 and is acquired by the sensory information determination unit 152.

In a case where "taste information (cookie)" set as the first sensory information is selected, the management data acquisition unit 151 acquires the relevance data 232 from the server 20. For example, the sensory information determination unit 152 determines, as the second sensory information, sensory information having a degree of relevance to the "taste information (cookie)" set as the first sensory information exceeding a threshold, on the basis of the relevance data 232.

In the example illustrated in FIG. 10, a degree of relevance of "visual information (cookie), tactile information (cookie), and olfactory information (cookie)" to "taste information (cookie)" set as the first sensory information is "80%". Assuming that a threshold is "70%", "visual information (cookie), tactile information (cookie), and olfactory information (cookie)" has the degree of relevance of 80% to the "taste information (cookie)" set as the first sensory information exceeding the threshold "70%", so the sensory information determination unit 152 determines "visual information (cookie), tactile information (cookie), and olfactory information (cookie)" as the second sensory information.

Then, the presentation control unit 153 controls the presentation of the presentation data associated with the second sensory information "visual information (cookie), tactile information (cookie), and olfactory information (cookie)" to the user U2. Such a configuration makes it possible for the user U2 to experience sensation (visual, auditory, and olfactory sensation relating to a cookie) corresponding to the sensation (sensation of taste relating to a cookie) actually experienced by the user U1.

In this example, in particular, it is assumed that the presentation control unit 153 controls the presentation of the presentation data of the user U2 associated with "visual information (cookie), tactile information (cookie), and olfactory information (cookie)" set as the second sensory information, instead of "taste information (cookie)" set as the first sensory information. This allows the user U2 to indirectly experience the sensation (sensation of taste relating to a cookie) that the user U2 wants to experience.

Moreover, in the example described above, a case is mainly described in which whether or not the presentation data associated with the first sensory information is presented to the user U2 is determined in advance. However, whether or not the presentation data associated with the first sensory information is presented to the user U2 can be controlled depending on the situation. In other words, the presentation control unit 153 can determine whether or not to control the presentation of the presentation data associated with the first sensory information to the user U2 on the basis of a predetermined condition.

The predetermined condition can be any condition. For example, the predetermined condition can include a condition indicating whether or not there is a presentation device that presents the presentation data associated with the first sensory information. In other words, the presentation control unit 153 can determine whether or not to control the presentation data associated with the first sensory information to the user U2 depending on whether or not the user U2 has the presentation device that presents the presentation data associated with the first sensory information.

Alternatively, the predetermined condition can be a condition indicating whether or not a setting for allowing the presentation of the presentation data associated with the first sensory information is made. In other words, the presentation control unit 153 can determine whether or not to control the presentation of the presentation data associated with the first sensory information to the user U2 depending on whether or not the setting for allowing the presentation of the presentation data associated with the first sensory information is made (depending on the preference setting of the user U2 or power mode setting).

For example, the presentation control unit 153, in a case where the power saving mode is set, does not control the presentation of the presentation data associated with the first sensory information to the user U2, and in a case where the power saving mode is not set, can control the presentation of the presentation data associated with the first sensory information to the user U2. Alternatively, for example, in a case where it is preferable that the presentation data associated with the first sensory information (e.g., taste information) is not presented for sanitary reasons or the like, it is also assumed that the presentation of the presentation data associated with the first sensory information to the user U2 is not controlled.

Figure 11:
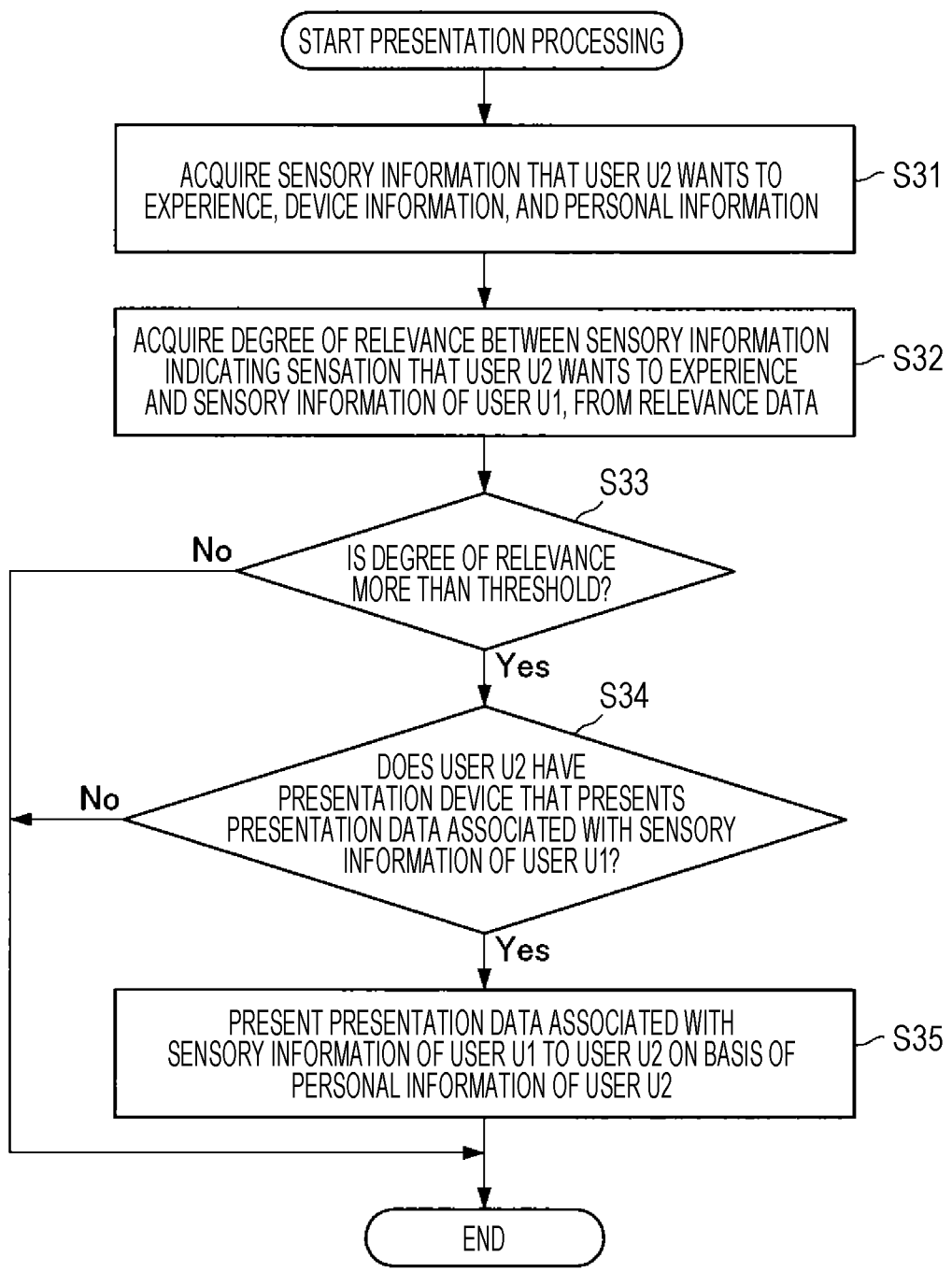
FIG. 11 is a flowchart illustrating a first example of presentation processing performed by the information processing system according to an embodiment of the present disclosure.

FIG. 11 is a flowchart illustrating the first example of the presentation processing performed by the information processing system 1 according to an embodiment of the present disclosure. Moreover, the flowchart illustrated in FIG. 11 merely illustrates an example of the presentation processing performed by the information processing system 1 according to an embodiment of the present disclosure. For example, in the example illustrated in FIG. 11, it is mainly assumed that the user U2 experiences the sensation similar to the sensation that the user U1 has experienced. However, the user U2 can be able to experience sensation similar to the sensation that the user U2 has experienced. Further, the presentation processing performed by the information processing system 1 according to an embodiment of the present disclosure is not limited to the example of the flowchart illustrated in FIG. 11.

In the user terminal 10-2, the user U2 first selects information indicating the sensation that the user U2 wants to experience (first sensory information). In such a case, the first sensory information selected by the user U2 is received by the operation unit 160 and is acquired by the sensory information determination unit 152. In addition, device information and personal information are also acquired by the sensory information determination unit 152 (S31).

The device information can include information indicating the type of the presentation device 40-2 possessed by the user U2 (i.e., information indicating the type of the presentation device 40-2 connected to the user terminal 10-2). The type of the presentation device 40-2 can be the type of presentation data that can be presented to the user U2 by the presentation device 40-2 (i.e., the type of sensation that the presentation device 40-2 enables the user U2 to experience). In addition, the personal information is information regarding the user U2 and can include age, gender, or the like of the user U2.

In a case where the sensory information (first sensory information) indicating the sensation that the user U2 wants to experience is selected, the management data acquisition unit 151 acquires the relevance data 232 from the server 20. Then, the sensory information determination unit 152 acquires, from the relevance data, the degree of relevance between the sensory information indicating the sensation that the user U2 wants to experience (first sensory information) and the sensory information of the user U1 (S32). The sensory information determination unit 152 determines whether or not the degree of relevance is more than a threshold (S33).

If the degree of relevance is equal to or less than a threshold ("No" in S33), the sensory information determination unit 152 terminates the presentation processing. On the other hand, in a case where the degree of relevance is more than a threshold ("Yes" in S33), the sensory information determination unit 152 determines whether or not the user U2 has the presentation device 40-2 that presents the presentation data associated with the sensory information of the user U1 on the basis of the device information (S34).

If the user U2 does not have the presentation device 40-2 that presents the presentation data associated with the sensory information of the user U1 ("No" in S34), the presentation control unit 153 terminates the presentation processing. On the other hand, if the user U2 has the presentation device 40-2 that presents the presentation data associated with the sensory information of the user U1 ("Yes" in S34), the presentation control unit 153 controls the presentation data associated with the sensory information of the user U1 to be presented to the user U2 on the basis of the personal information of the user U2 (S35), and terminates the presentation processing.

The presentation data based on the personal information of the user U2 is not limited to a particular type. For example, it is considered that desirably the lower the age of the user U2, the smaller the intensity of the sensation experienced by the user U2. Thus, the presentation control unit 153 can perform control such that the presentation data associated with the sensory information indicating the sensation with lower intensity is presented to the user U2 as the age of the user U2 is lower.

Alternatively, in a case where the gender of the user U2 is a female, it is considered that the intensity of the sensation experienced by the user U2 is desirably less than in a case where the gender of the user U2 is a male. Thus, in a case where the gender of the user U2 is a female, the presentation control unit 153 can perform control so that the presentation data associated with the sensory information indicating the sensation having a smaller intensity than in a case where the gender of the user U2 is a male is presented to the user U2. Moreover, the presentation data may not necessarily be particularly dependent on the personal information of the user U2.

The first example of the presentation processing performed by the information processing system 1 according to an embodiment of the present disclosure is described above.

1.5.2 Second Example

A second example of the presentation processing performed by the information processing system 1 according to an embodiment of the present disclosure is now described. It is now assumed that, in a case where the biometric information of the user U2 is associated with the biometric information of the user U1, the sensation experienced by the user U2 is accompanied by a stronger realistic feeling by causing the user U2 to experience the sensation similar to that experienced by the user U1. In this event, in a case where the sensation experienced by the user U1 has a higher affinity than the sensation currently experienced by the user U2 to some extent, the sensation experienced by the user U1 is also experienced by the user U2.

Moreover, in a similar manner to the case assumed below, in a case where the biometric information of the user U2 is associated with the biometric information in the past of the user U2, the sensation experienced by the user U2 can be accompanied by a stronger realistic feeling by causing the user U2 to experience again the sensation similar to the sensation experienced in the past by the user U2.

It is now assumed that the sensory information determination unit 152 acquires sensory information based on the user U2 (first sensory information) and biometric information based on the user U2 (first biometric information). In such a case, the sensory information determination unit 152 determines, as the second sensory information, the sensory information, which is sensed from the same user (the user U1 in this example) at the timing associated with the second biometric information corresponding to the first biometric information and is relevant to the first sensory information. The second biometric information corresponding to the first biometric information can be the second biometric information that as the same as or similar to (having the same characteristics) the first biometric information.

A description is now given using the biometric information input by the user U2 (Especially, biometric information registered by the user U2 on a social networking service (SNS)) as the biometric information based on the user U2 (first biometric information). However, the biometric information based on the user U2 (first biometric information) can be biometric information obtained by the detection device 30-2 that senses the user U2.

Further, a description is given using the sensory information input by the user U2 (Especially, sensory information registered by the user U2 on the SNS) as the sensory information based on the user U2 (first sensory information). However, the sensory information based on the user U2 (first biometric information) can be sensory information obtained by the detection device 30-2 that senses the user U2.

Figure 12:
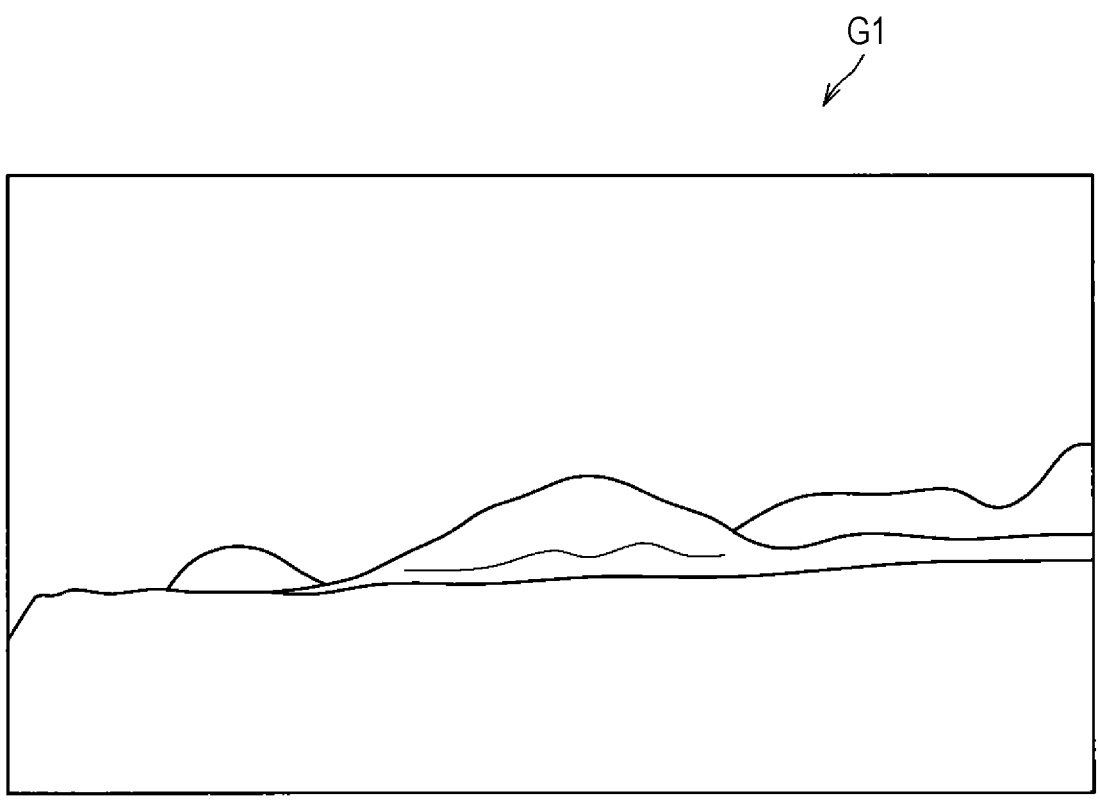
FIG. 12 is a diagram illustrating an example of information indicating sensation currently experienced by a user.

The second example of the presentation processing performed by the information processing system 1 according to an embodiment of the present disclosure is now described in detail. FIG. 12 is a diagram illustrating an example of information indicating the sensation currently experienced by the user U2. Referring to FIG. 12, visual information G1 is shown as an example of information indicating the sensation (sensory information) currently experienced by the user U2. The user U2 experiences the sensation indicated by the visual information G1, so the user experiences the visual sensation regarding the mountain.

Figure 13:
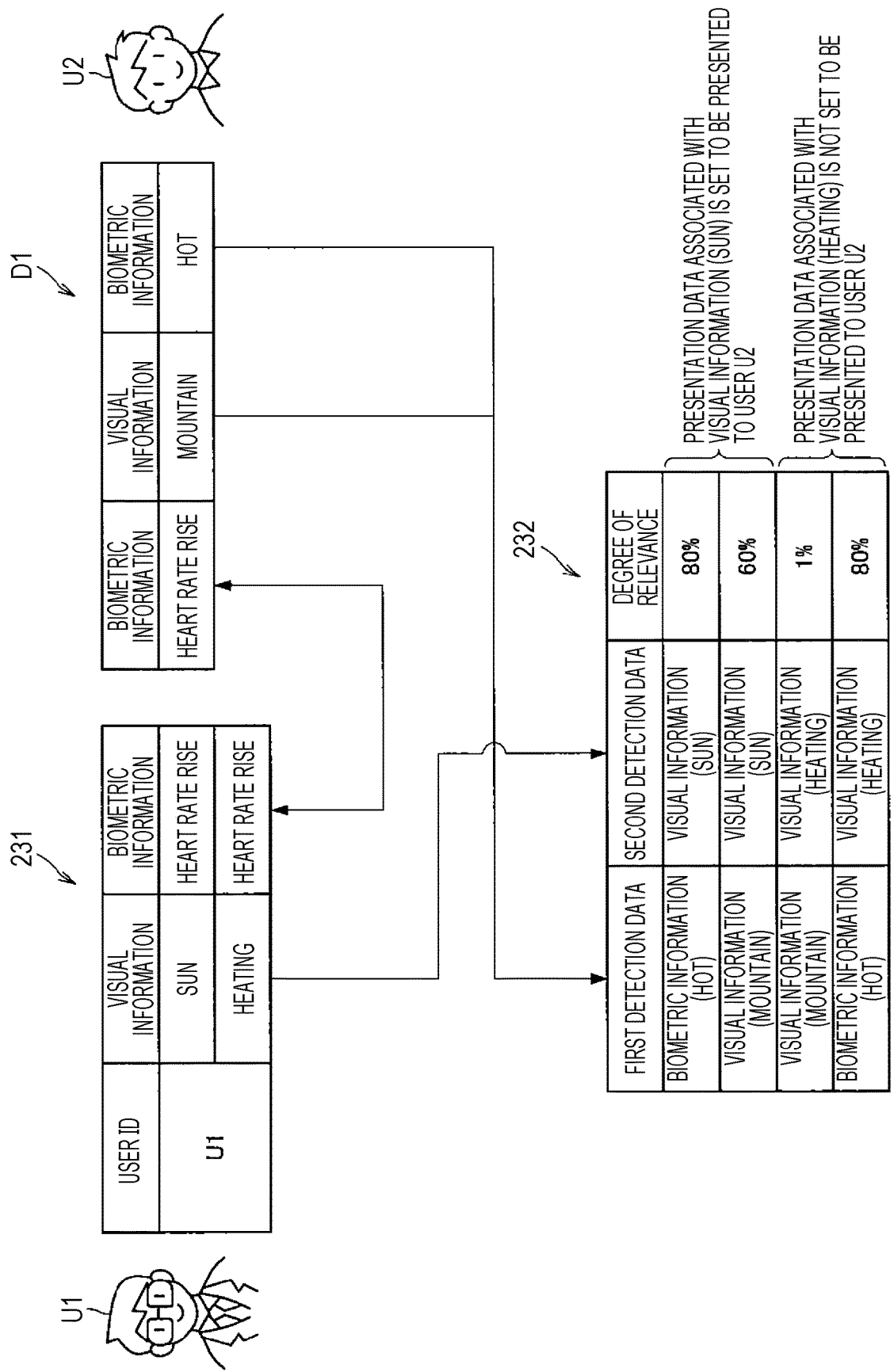
FIG. 13 is a diagram illustrated to specifically describe a second example of the presentation processing performed by the information processing system according to an embodiment of the present disclosure.

FIG. 13 is a diagram illustrated to specifically describe the second example of the presentation processing performed by the information processing system 1 according to an embodiment of the present disclosure. It is now assumed that, in a case where the sensation indicated by the visual information G1 is being experienced by the user U2, as shown in data D1, biometric information (heart rate rise), visual information (mountain), and biometric information (hot) are registered on the SNS by the user U2. In such a case, the sensory information determination unit 152 acquires the biometric information (heart rate rise), the visual information (mountain), and the biometric information (hot).

On the other hand, it is assumed that, as an experience of the user U1, in a case where the user U1 experiences visual sensation regarding the sun, the user U1 experiences that sweating becomes excessive and the heart rate rises because of direct exposure to sunlight emitted by the sun. In such a case, as illustrated in FIG. 13, the data in which the user ID "U1", visual information (sun), and biometric information (heart rate rise) correlate with each other is registered in the storage data 231.

Similarly, it is assumed that, as an experience of the user U1, in a case where the user U1 experiences visual sensation regarding heating, the user U1 experiences that sweating becomes excessive and the heart rate rises because of staying at a place where the user U1 can see the heating close. In such a case, as illustrated in FIG. 13, the data in which the user ID "U1", visual information (heating), and biometric information (heart rate rise) correlate with each other is registered in the storage data 231.

The sensory information determination unit 152, when acquiring the biometric information (heart rate rise), the visual information (mountain), and the biometric information (hot) of the user U2, acquires the biometric information of the user U1 corresponding to the biometric information of the user U2. In this example, the sensory information determination unit 152 acquires the biometric information (heart rate rise) of the user U1 from the storage data 231 as the biometric information having the same characteristics as the biometric information of the user U2 (heart rate rise). Then, the sensory information determination unit 152 acquires, from the storage data 31, the visual information (sun) and the visual information (heating) as the sensory information sensed from the user U1 at a timing corresponding to the biometric information of the same user U1 (heart rate rise).

Subsequently, the sensory information determination unit 152 determines, as the second sensory information, sensory information that is relevant to both the visual information (mountain) and the biometric information (hot) being currently experienced by the user U2 among the visual information (sun) and the visual information (heating) sensed from the user U1.

Referring to the relevance data 232, the visual information (sun) has the degree of relevance of 80% to the visual information (mountain) and has the degree of relevance of 60% to the biometric information (hot). For example, it is assumed that a threshold is 50%. In such a case, the degree of relevance of the visual information (sun) to both the visual information (mountain) and the biometric information (hot) exceeds the threshold. Thus, it can be said that the visual information (sun) is relevant to both the visual information (mountain) and the biometric information (hot).

Thus, the visual information (sun) sensed from the user U1 is considered to have a higher affinity than both the visual information (mountain) and the biometric information (hot) being currently experienced by the user U2 to some extent, so the presentation data associated with the visual information (sun) can be presented to the user U2.

Moreover, in a case where the same type of sensory information as the sensory information of the user U1 (second sensory information) is not acquired from the user U2, the sensory information determination unit 152 can control the presentation data associated with the sensory information of the user U1 to be unconditionally presented to the user U2. For example, the sensory information can be tactile information (cat hair), olfactory information (mint), or the like.

In a case where the same type of sensory information as the sensory information of the user U1 (second sensory information) is not acquired from the user U1, the sensory information determination unit 152 can perform control so that the presentation data associated with the sensory information of the user U2 is presented to the user U2 as it is. For example, the sensory information can be auditory information, biometric information (legs are heavy), or the like. The presentation data associated with the biometric information (legs are heavy) can be given to the user by applying pressure to the user's legs.

On the other hand, referring to the relevance data 232, the visual information (heating) has the degree of relevance of 1% to the visual information (mountain) and has the degree of relevance of 80% to the biometric information (hot). In a similar manner, it is assumed that the threshold value is 50%. In such a case, the degree of relevance of the visual information (heating) to the biometric information (hot) exceeds the threshold, but the degree of relevance of the visual information (heating) to the visual information (mountain) is equal to or less than the threshold. Thus, it can be said that the visual information (heating) is relevant to the biometric information (hot) but is not relevant to the visual information (mountain).

Accordingly, it is considered that the visual information (heating) sensed from the user U1 has a higher affinity with the biometric information (hot) being currently experienced by the user U2 to some extent, but has not very high affinity with the visual information (mountain), so the presentation data associated with the visual information (heating) may not be necessarily presented to the user U2.

Figure 14:
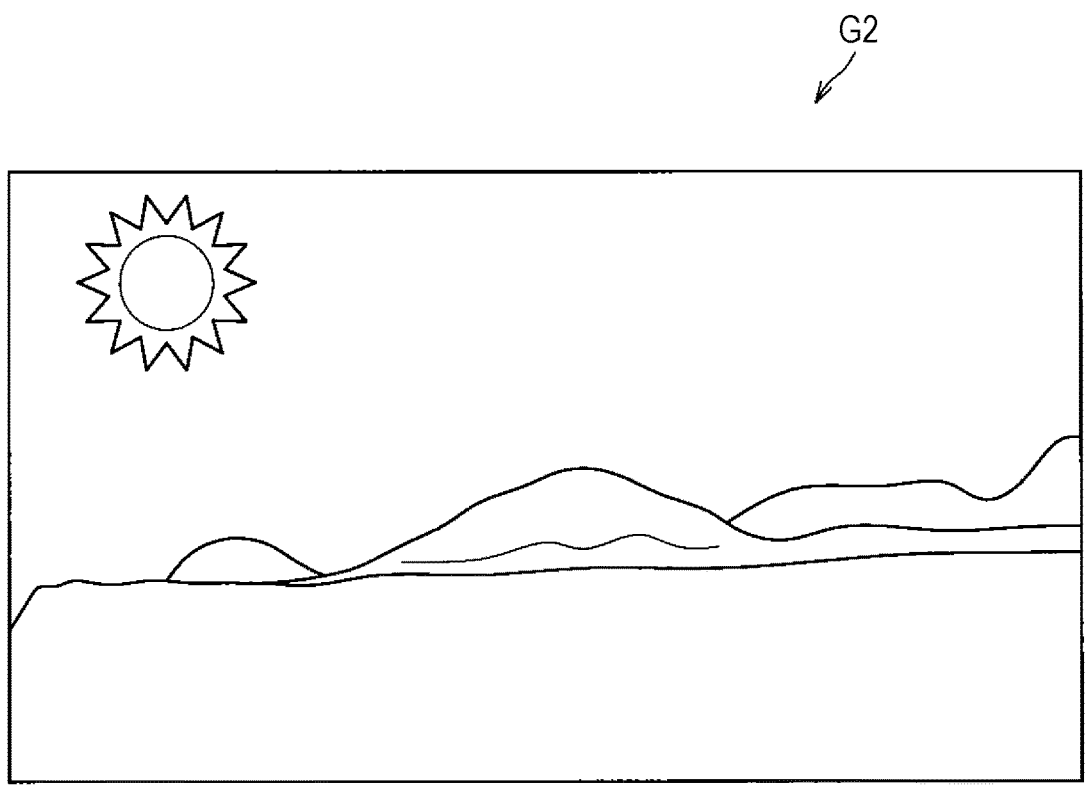
FIG. 14 is a diagram illustrated to describe a case where presentation data associated with visual information experienced by a user is set to be presented to another user.

FIG. 14 is a diagram illustrated to describe a case where the presentation data associated with the visual information experienced by the user U1 is to be presented to the user U2. As described above with reference to FIG. 13, the presentation data associated with the visual information (sun) experienced by the user U1 is presented to the user U2. This allows the sensation associated with the visual information (sun) to be also experienced by the user U2, so the sensation experienced by the user U2 is accompanied by a stronger realistic feeling.

Referring to FIG. 14, visual information G2 in which the visual information (sun) is added to the visual information G1 illustrated in FIG. 12 is shown. Moreover, as described above, the presentation data associated with the visual information (heating) is not to be presented to the user U2, so the visual information (heating) is not added to the visual information G2.

Figure 15:
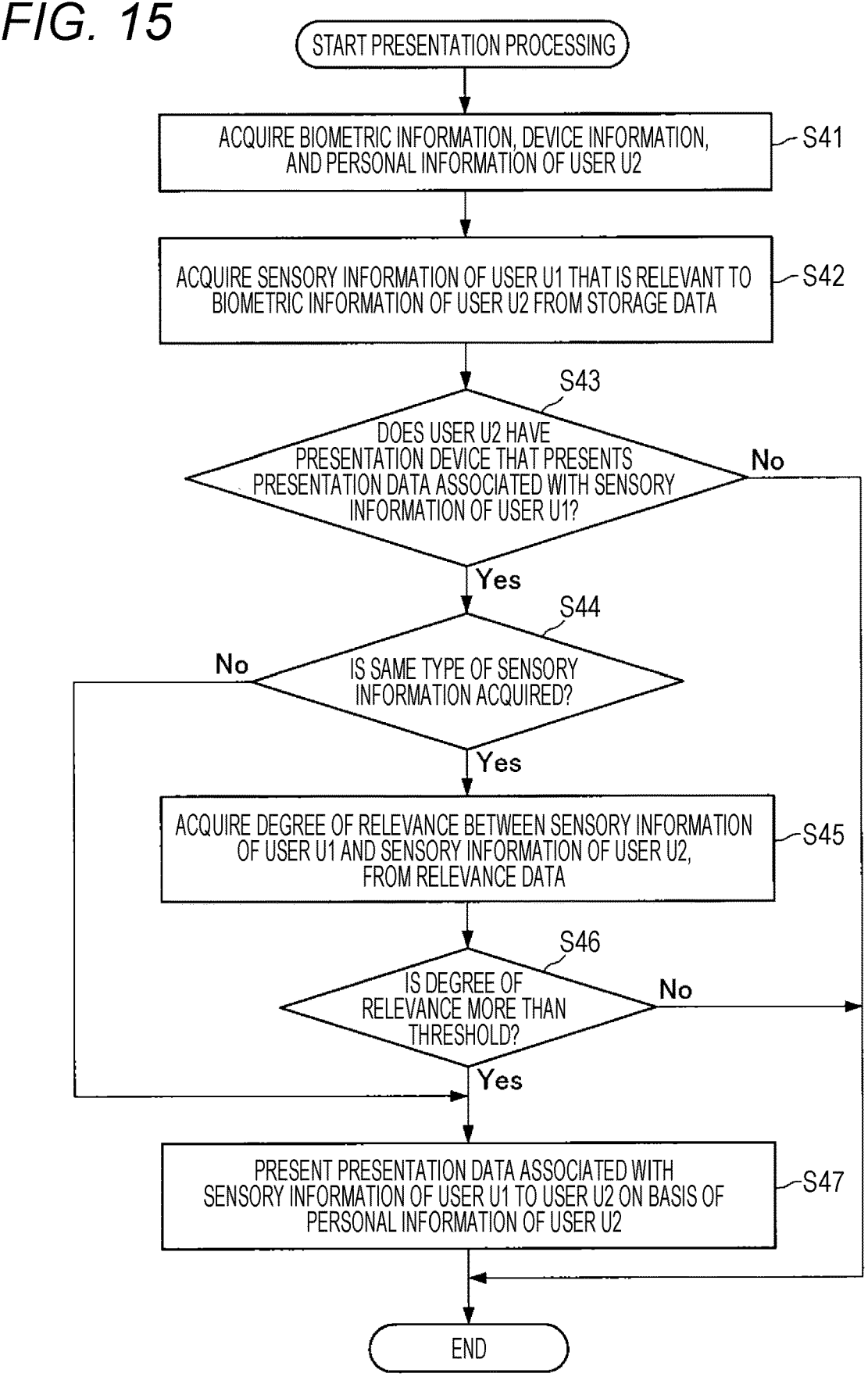
FIG. 15 is a flowchart illustrating the second example of the presentation processing performed by the information processing system according to an embodiment of the present disclosure.

FIG. 15 is a flowchart illustrating the second example of the presentation processing performed by the information processing system 1 according to an embodiment of the present disclosure. Moreover, the flowchart illustrated in FIG. 15 merely illustrates an example of the presentation processing performed by the information processing system 1 according to an embodiment of the present disclosure. For example, in the example illustrated in FIG. 15, it is mainly assumed that the user U2 experiences the sensation similar to the sensation that the user U1 has experienced. However, the user U2 can be able to experience sensation similar to the sensation that the user U2 has experienced. Further, the presentation processing performed by the information processing system 1 according to an embodiment of the present disclosure is not limited to the example of the flowchart illustrated in FIG. 15.

In the user terminal 10-2, the sensory information determination unit 152 first acquires the biometric information of the user U2 (first biometric information). In addition, the sensory information determination unit 152 also acquires device information and personal information (S41). In a case where the biometric information of the user U2 (first biometric information) is acquired by the sensory information determination unit 152, the management data acquisition unit 151 acquires the relevance data 232 from the server 20. Then, the sensory information determination unit 152 acquires the sensory information of the user U1 (second sensory information) that is relevant to the biometric information of the user U2 (first sensory information) from the relevance data (S42).

The sensory information determination unit 152 determines whether or not the user U2 has the presentation device 40-2 that presents the presentation data associated with the sensory information of the user U1 (second sensory information) on the basis of the device information (S43). If the user U2 does not have the presentation device 40-2 that presents the presentation data associated with the sensory information of the user U1 (second sensory information) ("No" in S43), the sensory information determination unit 152 terminates the presentation processing.

On the other hand, if the user U2 has the presentation device 40-2 that presents the presentation data associated with the sensory information of the user U1 (second sensory information) ("Yes" in S43), the operation branches to S44 by the sensory information determination unit 152.

If the same type of sensory information as the sensory information of the user U1 (second sensory information) is not acquired from the user U2 ("No" in S44), the operation branches to S47 by the sensory information determination unit 152. On the other hand, if the same type of sensory information as the sensory information of the user U1 (second sensory information) is acquired from the user U2 ("Yes" in S44), the sensory information determination unit 152 acquires, from the relevance data, the decree of relevance between the sensory information of the user U1 (second sensory information) and the sensory information of the user U2 (S45).

The sensory information determination unit 152 determines whether or not the degree of relevance is more than a threshold (S46). If the degree of relevance is equal to or less than the threshold ("No" in S16), the presentation control unit 153 terminates the presentation processing. On the other hand, if the degree of relevance is more than the threshold ("Yes" in S46), the presentation control unit 153 controls the presentation data associated with the sensory information of the user U1 to be presented to the user U2 on the basis of the personal information of the user U2 (S47), and then terminates the presentation processing.

The second example of the presentation processing performed by the information processing system 1 according to an embodiment of the present disclosure is described above.

1.5.3 Third Example

A third example of the presentation processing performed by the information processing system 1 according to an embodiment of the present disclosure is now described. In this example, it is assumed that, in a case where the type of the sensory information relevant to the sensory information (first sensory information) selected as described above is a first type, the sensory information determination unit 152 determines a second type of sensory information different from the first type as the second sensory information and the presentation control unit 153 presents the presentation data associated with the second sensory information to the user U2. This is effective in a case where the user U2 fails to perceive the sensation associated with the first type of sensory information or a case where the first type of sensory information is not perfect, for example.

For example, in a case where the type of the sensory information relevant to the selected sensory Information (first sensory information) is the first type, the sensory information determination unit 152 can determine the second type sensory information different from the first type as the second sensory information. This allows the sensory information similar to the sensory information relevant to the selected sensory information (first sensory information) to be determined as the second sensory information and allows the presentation data corresponding to the second sensory information to be presented to the user U2. Each of the first type and the second type is not limited to a particular type.

In this case, the sensory information determination unit 152, in a case where the type of the sensory information relevant to the selected sensory information (first sensory information) is the first type, can determines the second type of sensory information as the second sensory information on the basis of the recognition result of the sensory information. The recognition of sensory information can be performed in any manner.

For example, the sensory information determination unit 152, in a case where the selected sensory information (first sensory information) is visual information, can obtain, as a recognition result, a reflected sound of a user walking sound (auditory information), a flow of air (tactile information) or the like, on the basis of analysis of the visual information. Then, the auditory information (reflected sound of the user walking sound) and the tactile information (flow of air) can be determined as the second sensory information.

Alternatively, in a case where the selected sensory information (first sensory information) is visual information, the sensory information determination unit 152 can obtain a movement or the like of a cat's mouth as a recognition result by analyzing the visual information. Then, in a case where it is recognized that the cat's mouth is opened or closed, the cat's crying (auditory information) can be determined as the second sensory information. In this case, the cat's cry can be presented to the user U2 in accordance with the opening and closing of the cat's mouth.

Alternatively, in a case where the selected sensory information (first sensory information) is visual information, the sensory information determination unit 152 can obtain the positional relationship and the like between the user's hand and the cat as a recognition result by analyzing the visual information. Then, in a case where it is recognized that the user's hand touches the cat, the tactile information (cat hair) can be determined as the second sensory information. In this case, the tactile information (cat hair) can be presented to the user U2 in accordance with the movement of the user's hand.

For example, it is assumed that the user U2 is a visually impaired person and so fails to perceive the visual sensation, but is able to perceive the auditory and tactile sensation. In such a case, if the type of sensory information relevant to the sensory information selected by user U2 (first sensory information) is visual sensation, the sensory information determination unit 152 can determine auditory information or tactile information as the second sensory information associated with the presentation data to be presented to the user U2. In other words, the first type can include visual sensation and the second type can include at least one of auditory sensation or tactile sensation.

Figure 16:
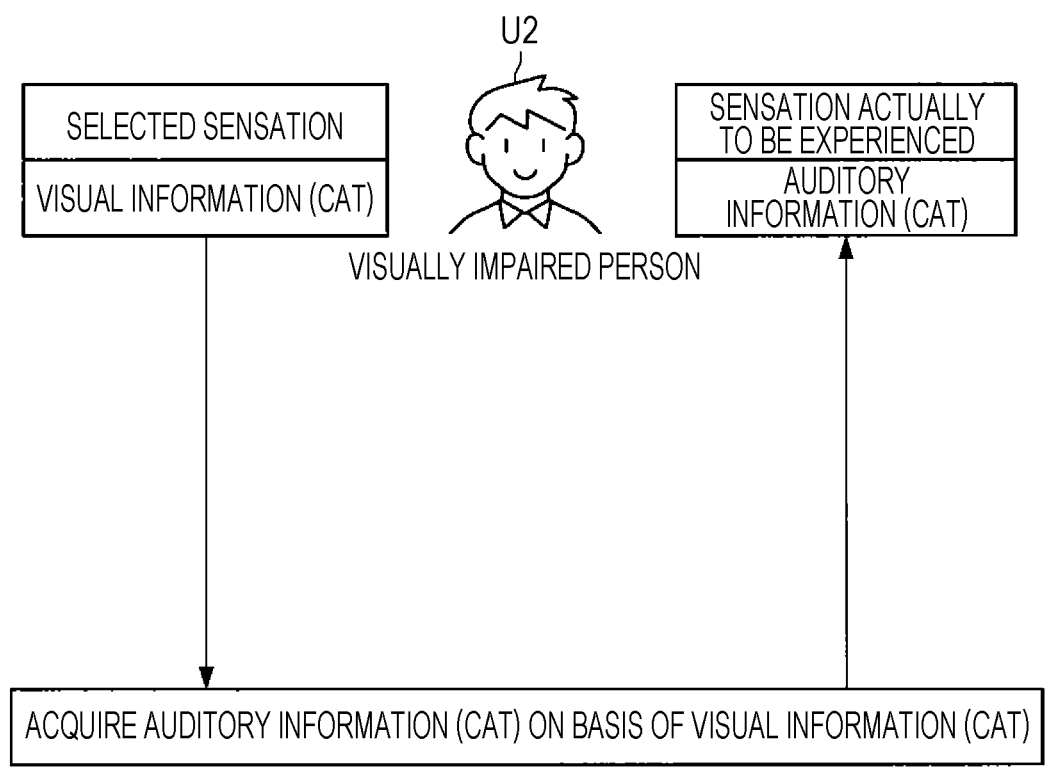
FIG. 16 is a diagram illustrated to specifically describe a third example of the presentation processing performed by the information processing system according to an embodiment of the present disclosure.

The third example of the presentation processing performed by the information processing system 1 according to an embodiment of the present disclosure is now described in detail. FIG. 16 is a diagram illustrated to specifically describe the third example of the presentation processing performed by the information processing system 1 according to an embodiment of the present disclosure. In this example, it is assumed that the user U2 is a visually impaired person. In such a case, it is assumed that the sensation associated with the visual information (cat) is selected. In this case, it is sufficient that the sensory information determination unit 152 acquires the auditory information (cat) on the basis of the visual information (cat). Then, the presentation control unit 153 preferably causes the user U2 to actually experience the auditory sensation associated with the auditory information (cat) by controlling the presentation of the presentation data associated with the auditory information (cat) to the user U2.

Figure 17:
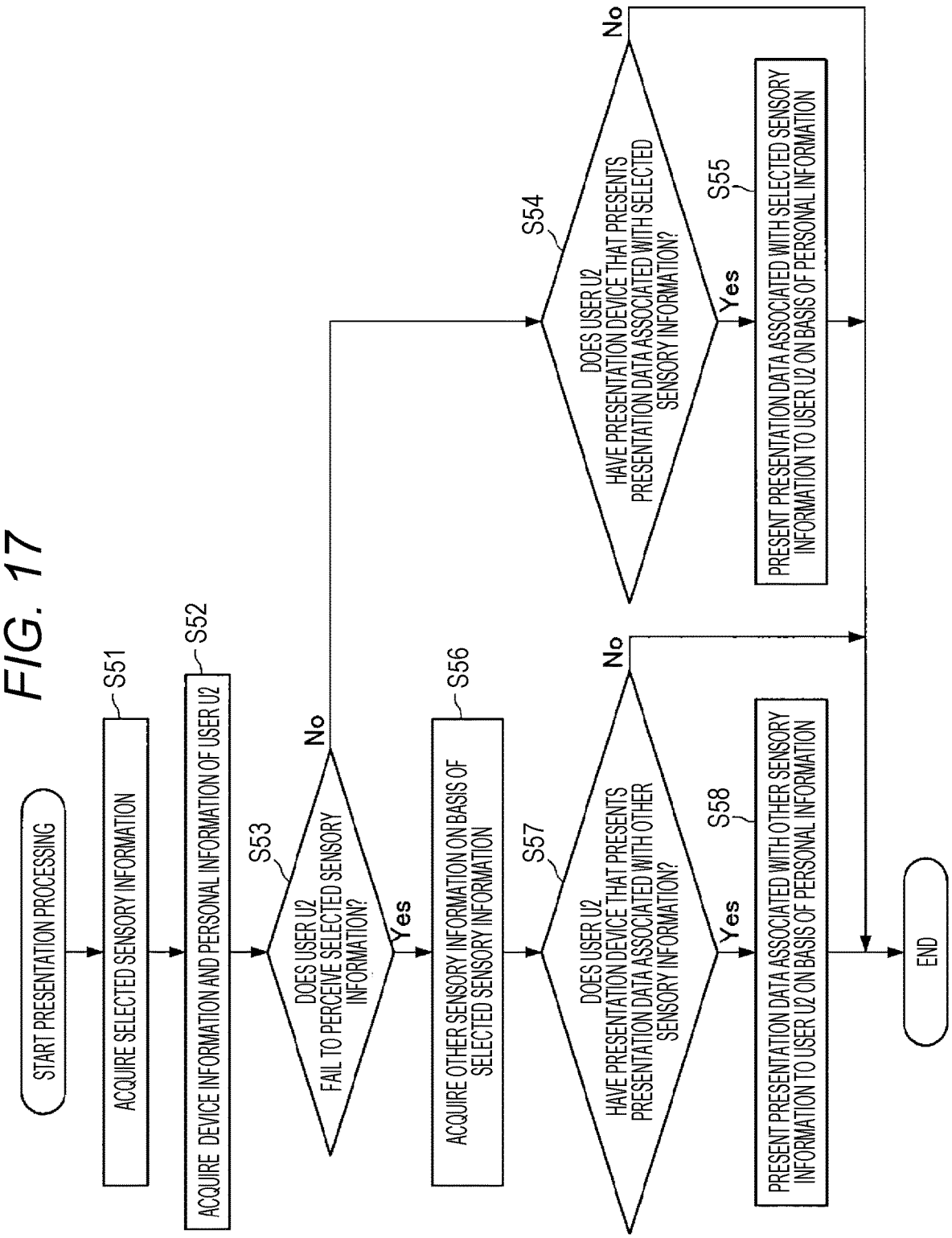
FIG. 17 is a flowchart illustrating the third example of the presentation processing performed by the information processing system according to an embodiment of the present disclosure.

FIG. 17 is a flowchart illustrating the third example of the presentation processing performed by the information processing system 1 according to an embodiment of the present disclosure. Moreover, the flowchart illustrated in FIG. 17 merely illustrates an example of the presentation processing performed by the information processing system 1 according to an embodiment of the present disclosure. Thus, the presentation processing performed by the information processing system 1 according to an embodiment of the present disclosure is not limited to the example of the flowchart illustrated in FIG. 17.

In the user terminal 10-2, first, the sensory information (first sensory information) selected as described above is acquired by the sensory information determination unit 152 (S51). In addition, device information and personal information are also acquired by the sensory information determination unit 152 (S52). In this example, if the user U2 is able to perceive the selected sensory information (first sensory information) ("No" in S53), the operation proceeds to S54, but if the user U2 fails to perceive the selected sensory information (first sensory information) ("Yes" in S53), the operation proceeds to S56.

In a case where the operation proceeds to S54, if the user U2 does not have the presentation device 40-2 that presents the presentation data associated with the selected sensory information ("No" in S54), the presentation control unit 153 terminates the presentation processing. On the other hand, if the user U2 has the presentation device 40-2 that presents the presentation data associated with the selected sensory information ("Yes" in S54), the presentation control unit 153 controls the presentation data associated with the selected sensory information to be presented to the user U2 on the basis of the personal information (S55), and terminates the presentation processing.

On the other hand, if the operation branches to S56, the sensory information determination unit 152 acquires other sensory information on the basis of the selected sensory information (S56). If the user U2 does not have the presentation device 40-2 that presents the presentation data associated with the other sensory information ("No" in S57), the presentation control unit 153 terminates the presentation processing. On the other hand, if the user U2 has the presentation device 40-2 that presents the presentation data associated with the other sensory information ("Yes" in S57), the presentation control unit 153 controls the presentation data associated with the other sensory information to be presented to the user U2 on the basis of the personal information (S55), and terminates the presentation processing.

The third example of the presentation processing performed by the information processing system 1 according to an embodiment of the present disclosure is described above.

2. Hardware Configuration Example

Figure 18:
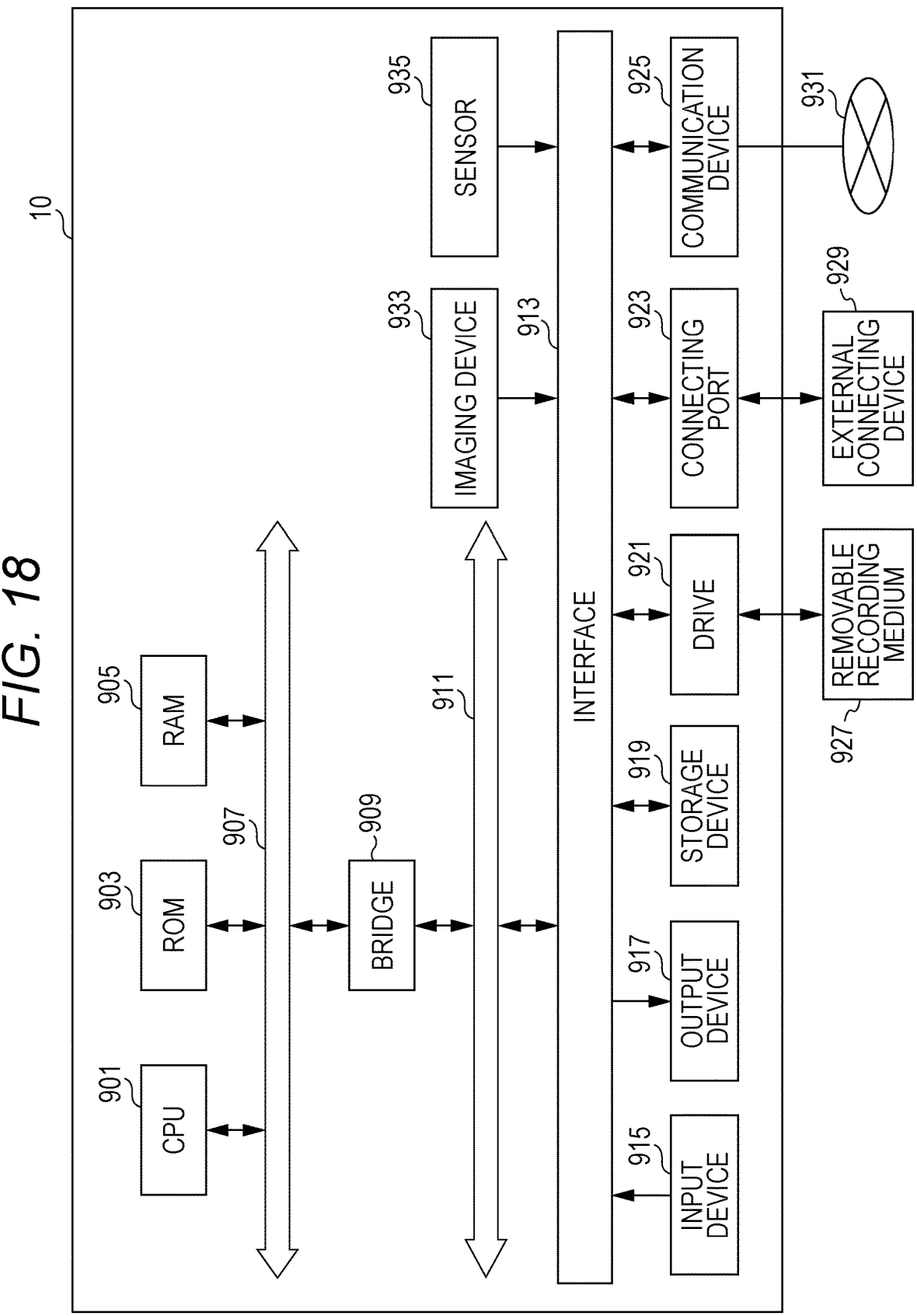
FIG. 18 is a block diagram illustrating an exemplary hardware configuration of an information processing apparatus according to an embodiment of the present disclosure.

Next, with reference to FIG. 18, a hardware configuration of the information processing apparatus (user terminal) 10 according to the embodiment of the present disclosure will be described. FIG. 18 is a block diagram illustrating the hardware configuration example of the information processing apparatus 10 according to the embodiment of the present disclosure. Note that although the example illustrated in FIG. 18 is a hardware configuration example of the information processing apparatus (user terminal) 10, a hardware configuration of the server 20 may be realized similarly to the hardware configuration example illustrated in FIG. 18.

As illustrated in FIG. 18, the information processing apparatus 10 includes a central processing unit (CPU) 901, read only memory (ROM) 903, and random access memory (RAM) 905. In addition, the information processing apparatus 10 may include a host bus 907, a bridge 909, an external bus 911, an interface 913, an input device 915, an output device 917, a storage device 919, a drive 921, a connection port 923, and a communication device 925. Moreover, the information processing apparatus 10 may include an imaging device 933 and a sensor 935, as necessary. The information processing apparatus 10 may include a processing circuit such as a digital signal processor (DSP) or an application specific integrated circuit (ASIC), alternatively or in addition to the CPU 901.

The CPU 901 serves as an arithmetic processing device and a control device, and controls the overall operation or a part of the operation of the information processing apparatus 10 according to various programs recorded in the ROM 903, the RAM 905, the storage device 919, or a removable recording medium 927. The ROM 903 stores programs, operation parameters, and the like used by the CPU 90, The RAM 905 temporarily stores programs used when the CPU 901 is executed, parameters that change as appropriate when executing such programs, and the like. The CPU 901, the ROM 903, and the RAM 905 are connected with each other via the host bus 907 configured from an internal bus such as a CPU bus. In addition, the host bus 907 is connected to the external bus 911 such as a Peripheral Component Interconnect/Interface (PCI) bus via the bridge 909.

The input device 915 is, for example, a device operated by a user such as a mouse, a keyboard, a touchscreen, a button, a switch, and a lever. The input device 915 may include a microphone configured to detect voice of users. The input device 915 may be a remote control device that uses, for example, infrared radiation and another type of radio waves. Alternatively, the input device 915 may be external connection equipment 929 such as a mobile phone that corresponds to an operation of the information processing apparatus 10. The input device 915 includes an input control circuit that generates input signals on the basis of information which is input by a user to output the generated input signals to the CPU 901. A user inputs various types of data and indicates a processing operation to the information processing apparatus 10 by operating the input device 915. In addition, the imaging device 933 to be described later may function as the input device by capturing an image of movement of hands of a user or capturing a finger of a user, for example. In this case, a pointing position may be decided in accordance with the movement of the hands or a direction of the finger.

The output device 917 includes a device that can visually or audibly report acquired information to a user. The output device 917 may be, for example, a display device such as a liquid crystal display (LCD), a plasma display panel (PDP), an organic electro-luminescence (EL) display, a projector, or a hologram display device, a sound output device such as a speaker or a headphone, a printer, or the like. The output device 917 outputs a result obtained through a process performed by the information processing apparatus 10, in the form of text or video such as an image, or sounds such as voice and audio sounds. In addition, the output device 917 may include a light or the like to light the surroundings.

The storage device 919 is a device for data storage that is an example of the storage unit of the information processing apparatus 10. The storage device 919 includes, for example, a magnetic storage unit device such as a hard disk drive (HDD), a semiconductor storage device, an optical storage device, a magneto-optical storage device, or the like. The storage device 919 stores therein various data and programs executed by the CPU 901, various data acquired from an outside, and the like.

The drive 921 is a reader/writer for the removable recording medium 927 such as a magnetic disk, an optical disc, a magneto-optical disk, and a semiconductor memory, and built in or externally attached to the information processing apparatus 10. The drive 921 reads out information recorded on the mounted removable recording medium 927, and outputs the information to the RAM 905. Further, the drive 921 writes the record into the mounted removable recording medium 927.

The connection port 923 is a port used to directly connect equipment to the information processing apparatus 10. The connection port 923 may be, for example, a universal serial bus (USB) port, an IEEE1394 port, and a Small Computer System Interface (SCSI) port, or the like. In addition, the connection port 923 may be an RS-232C port, an optical audio terminal, a High-Definition Multimedia Interface (HDMI) (registered trademark) port, and so on. The connection of the external connection equipment 929 to the connection port 923 makes it possible to exchange various kinds of data between the information processing apparatus 10 and the external connection equipment 929.

The communication device 925 is a communication interface including, for example, a communication device for connection to a communication network 931, and the like. The communication device 925 may be, for example, a wired or wireless local area network (LAN), Bluetooth (registered trademark), a communication card for a wireless USB (WUSB), or the like. Further, the communication device 925 may also be, for example, a router for optical communication, a router for asymmetric digital subscriber line (ADSL), a modem for various types of communication, or the like. For example, the communication device 925 transmits and receives signals and the like in the Internet or transmits signals to and receives signals from another communication device by using a predetermined protocol such as TCP/IP. Further, the communication network 931 to which the communication device 925 connects is a network established through wired or wireless connection. The communication network 931 is, for example, the Internet, a home LAN, infrared communication, radio communication, satellite communication, or the like.

The imaging device 933 is a device that captures images of a real space by using an image sensor such as a charge coupled device (CCD) or a complementary metal oxide semiconductor (CMOS), for example, and various members such as a lens for controlling image formation of a subject image onto the image sensor, and generates the captured images. The imaging device 933 may capture a still image or a moving image.

The sensor 935 is various sensors such as a ranging sensor, an acceleration sensor, a gyro sensor, a geomagnetic sensor, a vibration sensor, an optical sensor, and a sound sensor, for example. The sensor 935 acquires information regarding a state of the information processing apparatus 10 such as a posture of a housing of the information processing apparatus 10, and information regarding an environment surrounding the information processing apparatus 10 such as luminous intensity and noise around the information processing apparatus 10, for example. Further, the sensor 935 may include a global positioning system (GPS) sensor that receives GPS signals to measure latitude, longitude, and altitude of the device.

3. Concluding Remarks

According to an embodiment of the present disclosure as described above, there is provided an information processing apparatus including a data acquisition unit, a sensory information determination unit, and a presentation control unit. The data acquisition unit acquires relevance data of a plurality of pieces of sensory information sensed in advance, the sensory information determination unit determines second sensory information relevant to first sensory information on the basis of the relevance data, and the presentation control unit controls the presentation of presentation data associated with the second sensory information to a user.

According to such a configuration, it is possible for a user to experience sensation corresponding to the sensation actually experienced by the user or another user.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to create a computer program for causing hardware such as CPU, ROM, and RAM, which are embedded in a computer, to execute functions equivalent to the functions of the above-described control unit 110. Moreover, it may be possible to provide a computer-readable recording medium having the program recorded thereon.

The above description is mainly given of the case where the detection data acquisition unit 120, the detection data transmission control unit 140, the management data acquisition unit 151, the sensory information determination unit 152, and the presentation control unit 153 are incorporated into the user terminal 10-1. However, functions of these components can be incorporated into a device different from the user terminal 10. For example, the functions of these components can be incorporated into a robot or the like. This allows the improvement of the quality of services provided by the robot to be expected.

Further, the above description is mainly given of the case where the data acquisition unit 212, the storage control unit 214, and the relevance calculation unit 216 are incorporated into the server 20. However, functions of these components can be incorporated into a device different from the server 20. For example, the functions of these components can be incorporated in some or all of a plurality of user terminal 10.

Further, the effects described in this specification are merely illustrative or exemplified effects and are not necessarily limitative. That is, with or in the place of the above effects, the technology according to the present disclosure may achieve other effects that are clear to those skilled in the art from the description of this specification.

Additionally, the following configurations also belong to the technical scope of the present disclosure may.

(1)

An information processing apparatus including:

a data acquisition unit configured to acquire relevance data of a plurality of pieces of sensory information sensed in advance;

a sensory information determination unit configured to determine second sensory information relevant to first sensory information on the basis of the relevance data; and a presentation control unit configured to control presentation of presentation data associated with the second sensory information to a user.

(2)

The information processing apparatus according to (1), in which the presentation control unit controls presentation of presentation data associated with the first sensory information and controls the presentation of the presentation data associated with the second sensory information.

(3)
The information processing apparatus according to (1), in which the presentation control unit controls the presentation of the presentation data associated with the second sensory information without controlling presentation of presentation data associated with the first sensory information.

(4)
The information processing apparatus according to (1), in which the presentation control unit determines whether or not to control presentation of presentation data associated with the first sensory information on the basis of a predetermined condition.

(5)
The information processing apparatus according to (4), in which the predetermined condition includes a condition indicating whether or not there is a presentation device configured to present the presentation data associated with the first sensory information.

(6)
The information processing apparatus according to (5), in which the predetermined condition includes a condition indicating whether or not a setting for allowing the presentation of the presentation data associated with the first sensory information is made.

(7)
The information processing apparatus according to (1), in which the sensory information determination unit, in a case where first biometric information based on the user is obtained together with the first sensory information, determines, as the second sensory information, sensory information sensed from the same user at a timing corresponding to second biometric information associated with the first biometric information while being relevant to the first sensory information.

(8)
The information processing apparatus according to (7), in which the first biometric information includes at least one of biometric information obtained by performing a sensing operation on the user or biometric information input by the user.

(9)
The information processing apparatus according to (1), in which the sensory information determination unit, in a case where a type of sensory information relevant to the first sensory information is a first type, determines a second type of sensory information different from the first type as the second sensory information.

(10)
The information processing apparatus according to (9), in which the sensory information determination unit, in a case where the type of sensory information relevant to the first sensory information is the first type, determines, on the basis of a recognition result of the relevant sensory information, the second type of sensory information as the second sensory information.

(11)
The information processing apparatus according to (9) or (10),
in which the first type includes visual sensation, and
the second type includes at least one of auditory sensation or tactile sensation.

(12)
The information processing apparatus according to (1), in which the first sensory information is different in type from the second sensory information.

(13)
The information processing apparatus according to any one of (1) to (12),
in which the sensory information determination unit determines the second sensory information on the basis of sensory information having a degree of relevance to the first sensory information exceeding a threshold.

(14)
The information processing apparatus according to any one of (1) to (13),
in which the sensory information determination unit acquires the first sensory information selected by the user or a predetermined algorithm.

(15)
The information processing apparatus according to any one of (1) to (14),
in which a degree of relevance between the plurality of pieces of sensory information is calculated on the basis of a frequency at which the plurality of pieces of sensory information is sensed at a corresponding timing from the same user.

(16)
The information processing apparatus according to (15), in which the degree of relevance is, under a condition that one of the plurality of pieces of sensory information is sensed, a ratio at which another of the plurality of pieces of sensory information is sensed from the same user at a timing corresponding to the one.

(17)
The information processing apparatus according to any one of (1) to (16),
in which the first sensory information includes at least one of five types of sensory information.

(18)
The information processing apparatus according to (17), in which the five types of sensory information include visual information, auditory information, tactile information, olfactory information, and taste information.

(19)
An information processing method including:
acquiring relevance data of a plurality of pieces of sensory information sensed in advance;
determining second sensory information relevant to first sensory information on the basis of the relevance data; and
controlling, by a processor, presentation of presentation data associated with the second sensory information to a user.

(20)
A program for causing a computer to function as an information processing apparatus including:
a data acquisition unit configured to acquire relevance data of a plurality of pieces of sensory information sensed in advance;
a sensory information determination unit configured to determine second sensory information relevant to first sensory information on the basis of the relevance data; and
a presentation control unit configured to control presentation of presentation data associated with the second sensory information to a user.

REFERENCE SIGNS LIST

1 Information processing system
10 User terminal (information processing apparatus)
110 Control unit
120 Detection data acquisition unit
121 Visual information acquisition unit 122 Auditory information acquisition unit
123 Olfactory information acquisition unit
124 Tactile information acquisition unit
125 Taste information acquisition unit
131 Biometric information acquisition unit
132 Geographic information acquisition unit
133 Temporal information acquisition unit
134 Event information acquisition unit
135 Other information acquisition unit
136 User information acquisition unit
140 Detection data transmission control unit
151 Management data acquisition unit
152 Sensory information determination unit
153 Presentation control unit
160 Operation unit
170 Storage unit
180 Communication unit
190 Output unit
20 Server
210 Control unit
212 Data acquisition unit
214 Storage control unit
216 Relevance calculation unit
230 Storage unit
231 Storage data
232 Relevance data
240 Communication unit
30 Detection device
40 Presentation device
90 Network

The invention claimed is:

1. An information processing apparatus comprising:
circuitry configured to:
acquire relevance data of a plurality of pieces of sensory information sensed in advance;
determine second sensory information relevant to first sensory information on a basis of the relevance data; and
control presentation of presentation data associated with the second sensory information to a user,
wherein a degree of relevance between the plurality of pieces of sensory information is calculated on a basis of a frequency at which the plurality of pieces of sensory information is sensed at a corresponding timing from a same user.

2. The information processing apparatus according to claim 1,
wherein the circuitry is further configured to:
control presentation of presentation data associated with the first sensory information; and
control the presentation of the presentation data associated with the second sensory information.

3. The information processing apparatus according to claim 1,
wherein the circuitry is further configured to control the presentation of the presentation data associated with the second sensory information without controlling presentation of presentation data associated with the first sensory information.

4. The information processing apparatus according to claim 1,
wherein the circuitry is further configured to determine whether or not to control presentation of presentation data associated with the first sensory information on a basis of a predetermined condition.

5. The information processing apparatus according to claim 4,
wherein the predetermined condition includes a condition indicating whether or not there is a presentation device configured to present the presentation data associated with the first sensory information.

6. The information processing apparatus according to claim 5,
wherein the predetermined condition includes a condition indicating whether or not a setting for allowing the presentation of the presentation data associated with the first sensory information is made.

7. The information processing apparatus according to claim 1,
wherein the circuitry is further configured to, in a case where first biometric information based on the user is obtained together with the first sensory information, determine, as the second sensory information, sensory information sensed from a same user at a timing corresponding to second biometric information associated with the first biometric information while being relevant to the first sensory information.

8. The information processing apparatus according to claim 7,
wherein the first biometric information includes at least one of biometric information obtained by performing a sensing operation on the user or biometric information input by the user.

9. The information processing apparatus according to claim 1,
wherein the circuitry is further configured to, in a case where a type of sensory information relevant to the first sensory information is a first type, determine a second type of sensory information different from the first type as the second sensory information.

10. The information processing apparatus according to claim 9,
wherein the circuitry is further configured to, in a case where the type of sensory information relevant to the first sensory information is the first type, determine, on a basis of a recognition result of the relevant sensory information, the second type of sensory information as the second sensory information.

11. The information processing apparatus according to claim 9,
wherein the first type includes visual sensation, and
the second type includes at least one of auditory sensation or tactile sensation.

12. The information processing apparatus according to claim 1,
wherein the first sensory information is different in type from the second sensory information.

13. The information processing apparatus according to claim 1,
wherein the circuitry is further configured to determine the second sensory information on a basis of sensory information having a degree of relevance to the first sensory information exceeding a threshold.

14. The information processing apparatus according to claim 1,
wherein the circuitry is further configured to acquire the first sensory information selected by the user or a predetermined algorithm.

15. The information processing apparatus according to claim 1,
wherein the degree of relevance is, under a condition that one of the plurality of pieces of sensory information is sensed, a ratio at which another of the plurality of pieces of sensory information is sensed from the same user at a timing corresponding to the one.

16. The information processing apparatus according to claim 1,
wherein the first sensory information includes at least one of five types of sensory information.

17. The information processing apparatus according to claim 16,
wherein the five types of sensory information include visual information, auditory information, tactile information, olfactory information, and taste information.

18. An information processing method comprising:
acquiring relevance data of a plurality of pieces of sensory information sensed in advance;
determining second sensory information relevant to first sensory information on a basis of the relevance data; and
controlling, by a processor, presentation of presentation data associated with the second sensory information to a user,
wherein a degree of relevance between the plurality of pieces of sensory information is calculated on a basis of a frequency at which the plurality of pieces of sensory information is sensed at a corresponding timing from a same user.

19. A non-transitory computer-readable medium having embodied thereon a program, which when executed by a computer causes the computer to execute an information processing method, the method comprising:
acquiring relevance data of a plurality of pieces of sensory information sensed in advance;
determining second sensory information relevant to first sensory information on a basis of the relevance data; and
controlling presentation of presentation data associated with the second sensory information to a user,
wherein a degree of relevance between the plurality of pieces of sensory information is calculated on a basis of a frequency at which the plurality of pieces of sensory information is sensed at a corresponding timing from a same user.

* * * * *